US012808149B2

(12) United States Patent
Boehm

(10) Patent No.: US 12,808,149 B2
(45) **Date of Patent: *Nov. 24, 2026**

(54) APPARATUS AND METHOD FOR INSTALLING SUBSURFACE TUBING

(71) Applicant: Alldrip Sports Fields, LLC, Bryan, TX (US)

(72) Inventor: Matthew Christopher Boehm, Bryan, TX (US)

(73) Assignee: Alldrip Sports Fields, LLC, Bryan, TX (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/944,181

(22) Filed: Sep. 13, 2022

(65) Prior Publication Data

US 2023/0009955 A1 Jan. 12, 2023

Related U.S. Application Data

(63) Continuation-in-part of application No. 17/103,446, filed on Nov. 24, 2020, now Pat. No. 11,441,292.

(51) Int. Cl.

*E02F 5/10* (2006.01)
*E02F 5/08* (2006.01)
(Continued)

(52) U.S. Cl.

CPC .................. *E02F 5/10* (2013.01); *E02F 5/08* (2013.01); *E02F 5/12* (2013.01); *F16L 1/032* (2013.01)

(58) Field of Classification Search

CPC ..... F16L 1/032; F16L 3/22; E02F 5/08; E02F 5/10; E02F 5/102; E02F 5/12
See application file for complete search history.

(56) References Cited

U.S. PATENT DOCUMENTS 3,391,545 A 7/1968 Linneman
4,197,036 A 4/1980 Masquelier
(Continued)

FOREIGN PATENT DOCUMENTS

DE 102014105577 A1 10/2015
GB 410900 * 5/1934
WO WO 03/023152 * 3/2003

OTHER PUBLICATIONS

International Search Report and Written Opinion dated Mar. 23, 2022 for International Application No. PCT/US2021/060671.

*Primary Examiner* — Sean D Andrish
(74) *Attorney, Agent, or Firm* — Mackey Law Firm PLLC

(57) ABSTRACT

An apparatus for installing multiple strands of hose below a surface of terrain is provided. The apparatus comprises a chassis and rotating trenching blade assemblies connected to the chassis. The trenching blade assemblies are configured to dig parallel trenches when the apparatus is pulled along the terrain. Curved hose guides are connected to the chassis in trailing positions behind the trenching blades. Each hose guide receives hose from a hose reel on reel mounts connected to the chassis and deposits the hose into a trench dug by a trenching blade assembly. Trench fillers connected to the chassis trail the hose guides. Each trench filler is aligned with a respective hose guide and comprises a number of blades configured to push soil excavated from a trench back into the trench when the apparatus is pulled along the terrain.

20 Claims, 18 Drawing Sheets

(51) Int. Cl.
*E02F 5/12* (2006.01)
*F16L 1/032* (2006.01)

(56) References Cited

U.S. PATENT DOCUMENTS

| | | | | |
|---|---|---|---|---|
| 4,637,755 | A | 1/1987 | Tollefson et al. | |
| 4,812,078 | A | 3/1989 | Rivard | |
| 6,273,637 | B1 * | 8/2001 | Peterson ................. | E02F 5/223<br>404/127 |
| 6,637,978 | B1 | 10/2003 | Genta | |
| 7,524,142 | B2 | 4/2009 | Scott et al. | |
| 8,578,682 | B2 | 11/2013 | May et al. | |
| 9,267,620 | B2 | 2/2016 | Sjodahl et al. | |
| 10,760,244 | B1 | 9/2020 | Villette et al. | |
| 11,441,292 | B2 | 9/2022 | Boehm | |

* cited by examiner

APPARATUS AND METHOD FOR INSTALLING SUBSURFACE TUBING

CROSS REFERENCE TO RELATED APPLICATIONS

This application is a continuation in part of U.S. patent application Ser. No. 17/103,446 filed Nov. 24, 2020, the entire contents of which are incorporated by reference herein.

BACKGROUND INFORMATION

1. Field

The present invention relates generally to the installation of flexible tubing below ground and more specifically the installation of irrigation tubing.

2. Background

A popular method of irrigation comprises the use of dripline conduits installed below the surface of terrain. Such driplines comprise tubing with holes at intervals along its length through which water can seep into the ground. Sub-surface dripline irrigation has the advantage of delivering water more directly to plant roots without the problem of evaporation off the surface, wind causing the sprayed water to drift from its intended target, and run off before absorption into soil.

The drip irrigation market has primarily been dominated by the agricultural industry. For many years, farmers have installed drip tape (as opposed to drip tubing) to irrigate crops. Drought conditions across the US have begun to impact large end users of water such as municipalities, Parks & Recreation divisions, private sports associations, and even school districts. These entities have begun to consider the use of drip irrigation on their sport fields to help address water issues as well as other factors associated with the watering of sport fields including water costs and day to day maintenance of the irrigation systems.

Sub-surface installation of dripline can be very labor intensive and time consuming. Furthermore, manual installation over large areas such as, e.g., athletic fields, poses challenges for even and consistent distribution of the dripline and irrigation across the specified area.

SUMMARY

In at least one embodiment, an apparatus according to the disclosure can include a chassis, a trenching blade assembly comprising one or more trenching blades coupled to the chassis and configured to dig a trench in terrain, a reel mount in operable communication with the chassis, wherein the reel mount can be configured to hold a reel of hose, a hose guide connected to the chassis, wherein the hose guide can be configured to guide hose into the trench, and a trench filler-packer connected to the chassis, wherein the trench filler-packer can be configured to dispose soil excavated from the trench back into the trench and to pack at least a portion of the soil disposed back into the trench. In at least one embodiment, a trench filler-packer can include one or more blades, which can be disposed at one or more angles, such as relative to a centerline of a trench and/or a component of the apparatus. In at least one embodiment, an apparatus can be configured to, in a single pass, dig one or more trenches, dispose hose into one or more trenches, dispose soil excavated from one or more trenches back into the trenches, and pack at least a portion of the soil disposed back into the trenches. In at least one embodiment, a method can include in a single pass, digging one or more trenches, disposing hose into one or more trenches, disposing soil excavated from one or more tranches back into one or more trenches, and packing at least a portion of the soil disposed back into the one or more trenches.

An illustrative embodiment provides an apparatus for installing multiple strands of hose simultaneously below a surface of terrain. The apparatus comprises a chassis and a number of rotating trenching blade assemblies connected to the chassis approximately parallel to each other. The trenching blade assemblies are configured to dig respective trenches in the terrain when the apparatus is pulled along the terrain. A number of reel mounts are connected to the chassis and are configured to hold reels of hose. A number of curved hose guides are connected to the chassis in trailing positions relative to the trenching blade assemblies. Each hose guide is aligned with a corresponding trenching blade assembly and is configured to receive hose from a respective hose reel mounted on one of the reel mounts and deposit the hose into a trench dug by the corresponding trenching blade assembly. A number of trench filler-packers are connected to the chassis in trailing positions relative to the hose guides. Each trench filler-packer is aligned with a corresponding hose guide. The trench filler-packers comprise a number of blades configured to push soil excavated from the trenches back into the trenches when the apparatus is pulled along the terrain.

Another illustrative embodiment provides an apparatus for installing multiple strands of hose simultaneously below a surface of terrain. The apparatus comprises a chassis with a rotating shaft and a power take off gearbox configured to drive the shaft. Four trenching blade assemblies are connected to the rotating shaft, wherein the trenching blade assemblies are spaced 10 to 24 inches apart and are configured to dig parallel trenches in the terrain when the apparatus is pulled along the terrain. Two reel mounts are connected to the chassis. Each reel mount comprises a swiveling T bar configured to hold two reels of coiled hose. Four curved hose guides are connected to the chassis in trailing positions relative to the trenching blade assemblies. Each hose guide is aligned with a corresponding trenching blade assembly and comprises a tube configured to receive a hose from a respective hose reel mounted on one of the reel mounts and deposit the hose into a trench dug by the corresponding trenching blade assembly. Four trench filler-packers are connected to the chassis in trailing positions relative to the hose guides. Each trench filler-packer is aligned with a corresponding hose guide and comprises at least three successive blades offset from each other and configured to push soil excavated from one of the trenches back into the trench and at least two packing wheels interspersed with the blades, wherein the packing wheels are configured to pack soil pushed into the trench by the blades of the trench filler-packers as the apparatus is pulled along the terrain.

Another illustrative embodiment provides a method of installing hose simultaneously below a surface of terrain. The method comprises pulling an apparatus over the terrain. The apparatus comprises: a chassis; a number of rotating trenching blade assemblies connected to the chassis approximately parallel to each other, wherein the trenching blade assemblies are configured to dig respective trenches in the terrain when the apparatus is pulled along the terrain; a number of reel mounts connected to the chassis, wherein the reel mounts are configured to hold reels of hose; a number of curved hose guides connected to the chassis in trailing positions relative to the trenching blade assemblies, wherein each hose guide is aligned with a corresponding trenching blade assembly and is configured to receive hose from a respective hose reel mounted on one of the reel mounts and deposit the hose into a trench dug by the corresponding trenching blade assembly; and a number of trench filler-packers connected to the chassis in trailing positions relative to the hose guides, wherein each trench filler-packer is aligned with a corresponding hose guide, and wherein the trench filler-packers comprise a number of blades configured to push soil excavated from the trenches back into the trenches when the apparatus is pulled along the terrain. Hose is fed from reels on the reel mounts into the hose guides as the apparatus is pulled over the terrain.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
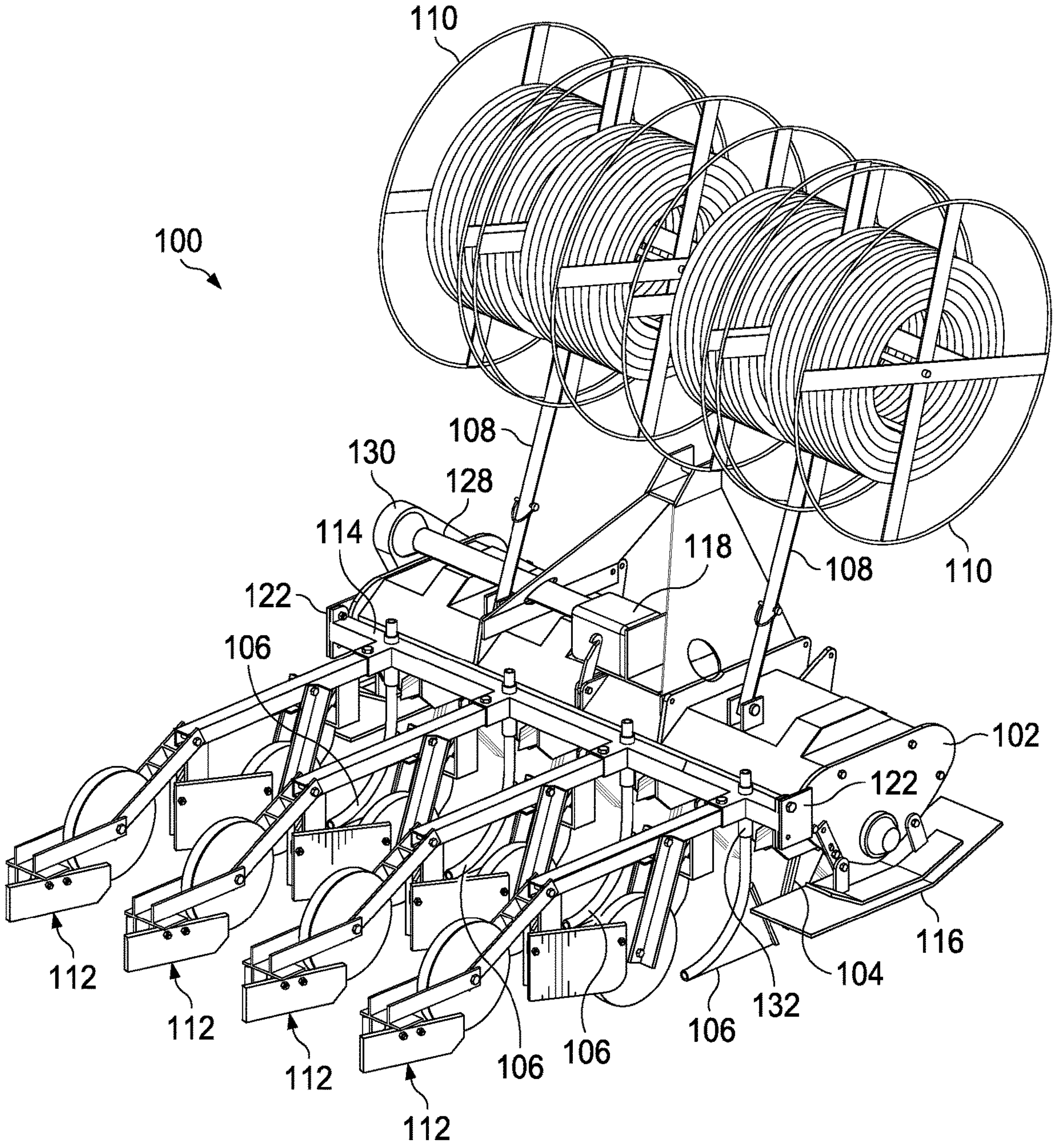
FIG. 1 depicts a rear perspective view of a subsurface tubing installation apparatus in accordance with an illustrative embodiment.

The illustrative embodiments recognize and take into account one or more different considerations. For example, the illustrative embodiments recognize and take into account that high labor costs and low adherence to manufacturers' recommended specifications during installation are two barriers preventing broader adoption of sub-surface dripline irrigation.

The illustrative embodiments also recognize and take into account that manual sub-surface installation of dripline can be time consuming and subject to inconsistency of line placement in both width apart and depth, especially over large areas.

The illustrative embodiments also recognize and take into account that products in the commercial market that can install subsurface drip irrigation having respective disadvantages. For example, single-row plows are labor intensive and are not capable of evenly and accurately spacing multiple strands of dripline during installation. Large scale multiple-row plows are set at a fixed spacing and are not capable of being adjusted to accommodate the type of soil into which dripline is to be installed. Different soil types absorb water at different rates. Consequently, the spacing of the dripline often needs to be adjusted according to soil type. In addition to the cost of machinery being expensive, multi-row plows also install dripline at a relatively slow pace, minimally contributing to the mechanical advantage that should be created with the capital investment in the equipment, thereby making multi-row plows an unattractive economic option to use by organizations.

Typically, budgeting costs for drip irrigation are double that of rotor irrigation systems. This cost difference is in part due to the lack of proper machinery available, needed to create a mechanical advantage significant enough to produce installation efficiencies that make sub-surface drip installation just as cost effective as traditional rotor system installation.

The illustrative embodiments provide an apparatus for trenching, laying flexible tubing/hose into the trench, grading and packing the soil back into the trench over the tubing/hose in a single pass. The apparatus can be pulled (or otherwise moved, such as by way of being pushed, dragged, self-propelled, driven, etc.) along the ground to dig parallel trenches a specified distance apart while depositing flexible tubing such as dripline into the trenches and then covering the dripline, refilling the excavated soil back into the trenches, and packing the refilled soil in one continuous process. An apparatus according to the disclosure can be configured for a single trench per pass or multiple trenches per pass (e.g., 2, 3, 4, 5 . . . n trenches per pass), as required or desired for a physical implementation of the disclosure at hand.

The illustrative embodiments allow accurate mass installation of sub surface drip irrigation according to manufacturer recommend specifications. The illustrative embodiments reduce installation labor costs by substantially increasing installation speed, while also accurately and consistently installing the dripline to a pre-set width and depth.

In at least one embodiment, an apparatus according to the disclosure can include a chassis, a trenching blade assembly comprising one or more trenching blades coupled to the chassis and configured to dig a trench in terrain, a reel mount in operable communication with the chassis, wherein the reel mount can be configured to hold a reel of hose, a hose guide connected to the chassis, wherein the hose guide can be configured to guide hose into the trench, and a trench filler-packer connected to the chassis, wherein the trench filler-packer can be configured to dispose soil excavated from the trench back into the trench and to pack at least a portion of the soil disposed back into the trench. In at least one embodiment, a trench filler-packer can include one or more blades, which can be disposed at one or more angles, such as relative to a centerline of a trench and/or a component of the apparatus. In at least one embodiment, an apparatus can be configured to, in a single pass, dig one or more trenches, dispose hose into one or more trenches, dispose soil excavated from one or more trenches back into the trenches, and pack at least a portion of the soil disposed back into the trenches. In at least one embodiment, a method can include in a single pass, digging one or more trenches, disposing hose into one or more trenches, disposing soil excavated from one or more tranches back into one or more trenches, and packing at least a portion of the soil disposed back into the one or more trenches.

Figure 2:
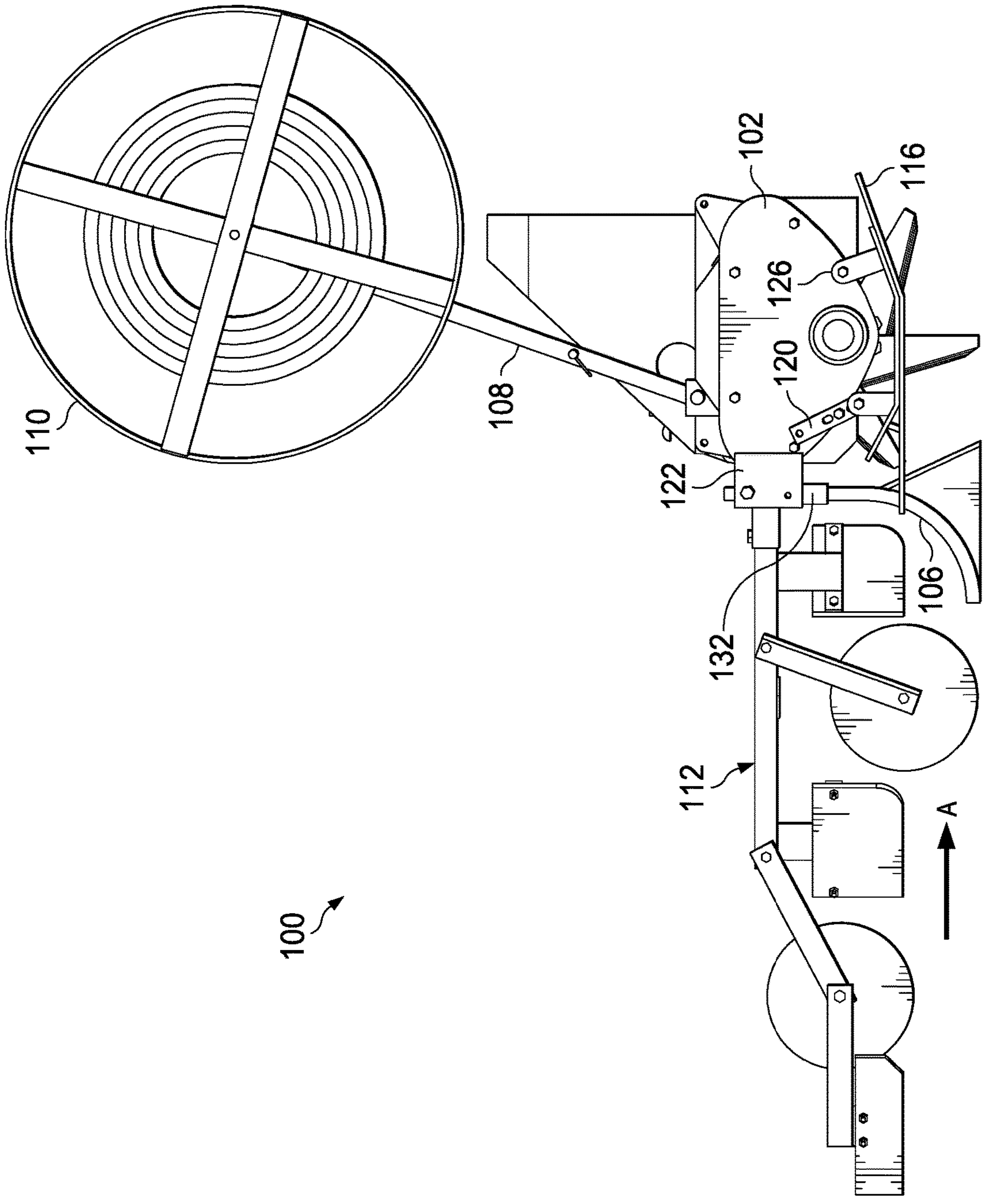
FIG. 2 depicts a side view of the subsurface tubing installation apparatus in accordance with an illustrative embodiment.
Figure 3:
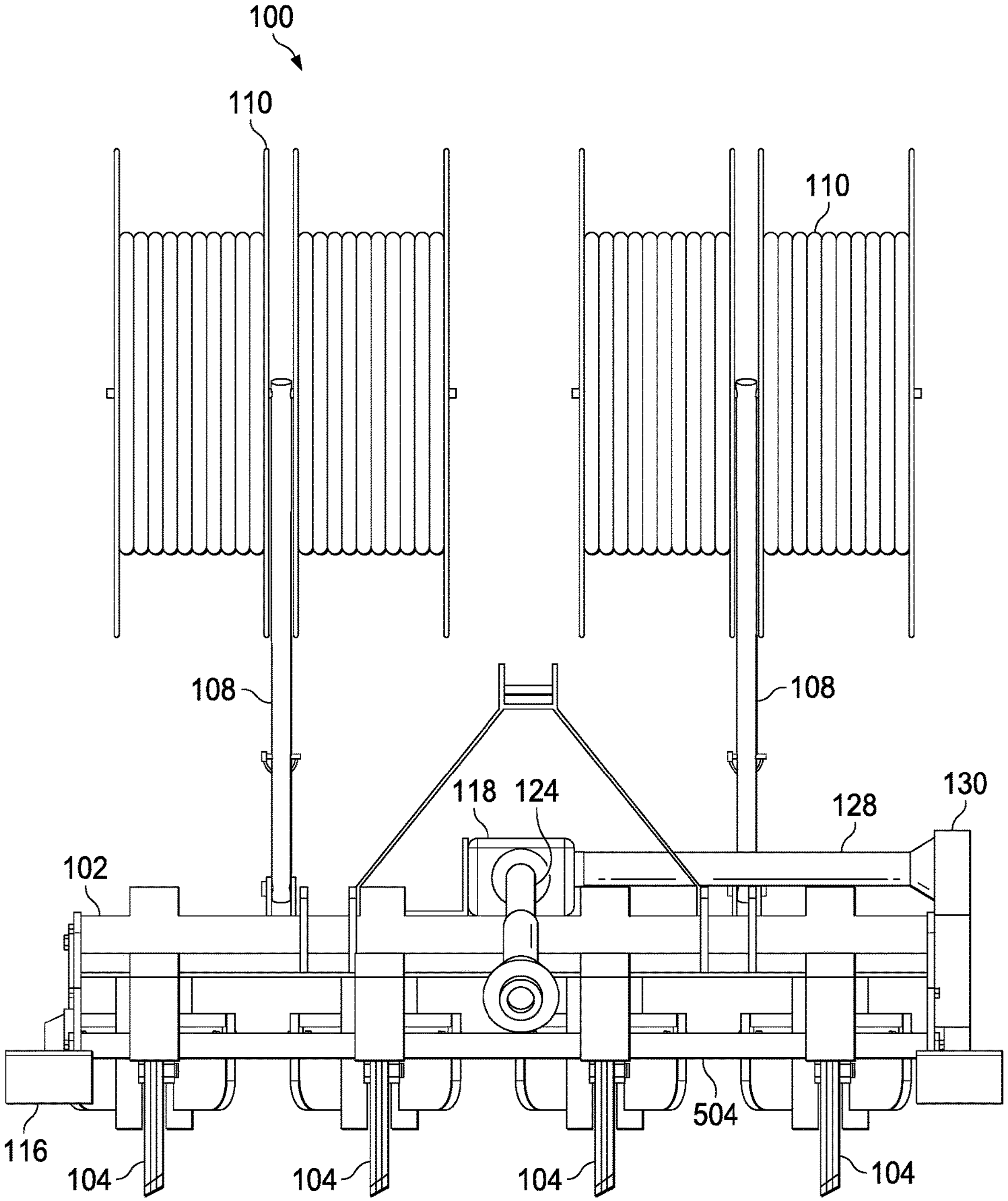
FIG. 3 depicts a front view of the subsurface tubing installation apparatus in accordance with an illustrative embodiment.

FIG. 1 depicts a rear perspective view of a subsurface tubing installation apparatus in accordance with an illustrative embodiment. FIG. 2 depicts a side view of the subsurface tubing installation apparatus. FIG. 3 depicts a front view of the subsurface tubing installation apparatus. Installation apparatus 100 is configured to be attached to a tractor or similar vehicle and pulled along the ground/terrain in the direction shown by arrow A. Movement of the installation apparatus 100 along the ground is facilitated by ground slides 116 on opposites sides of the chassis 102.

A number of shrouded, rotating trenching blade assemblies 104 are connected to chassis 102 approximately parallel to each other, shown most clearly in FIG. 3. In the present example, the trenching blade assemblies 104 are designed for reverse rotation digging. The trenching blade assemblies 104 are configured to dig respective parallel trenches in the terrain when the apparatus 100 is pulled along the terrain. In at least one embodiment, two or more trenching blade assemblies 104 can be spaced 10 to 24 inches apart on chassis 102, or another distance required or desired for an implementation of the disclosure, which can be less than 10 inches or greater than 24 inches.

In the present example, there are four trench blade assemblies 104 connected to the chassis 102. However, more or less trenching blade assemblies can be used depending on the needed application. In an embodiment (i.e., at least one embodiment), up to eight or more rows might be used, depending on row spacing. In another embodiment (see, e.g., FIG. 2), only a single trenching blade assembly might be present. The number of trenching blade assemblies (and therefore trench or parallel trenches dug simultaneously) will depend on user needs. The width of the trenching blades (and therefore trenches) can be increased or decreased depending on application.

A number of reel mounts 108 are connected to the chassis 102. The reel mounts 108 are configured to hold reels 110 of hose/tubing. The hose/tubing might comprise irrigation dripline that includes holes at set intervals along its length to allow water to seep out as it flows through the hose.

A number of curved hose guides 106 connected to the chassis 102 in trailing positions relative to the trenching blade assemblies 104. Each hose guide 106 is aligned with a corresponding trenching blade assembly and is configured to receive hose from a respective hose reel 110 mounted on one of the reel mounts 108 and deposit the hose into a trench dug by the corresponding trenching blade assembly 104.

A number of trench filler-packers (i.e. soil grading and packing attachments) 112 are connected to the chassis 102 in trailing positions relative to the hose guides 106. Each trench filler-packer 112 is aligned with a corresponding hose guide 106. The trench filler-packers 112 comprise a number of blades configured to push soil excavated from the trenches back into the trenches when the apparatus is pulled along the terrain. Trench filler-packers 112 also incorporate a number of packing wheels configured to pack soil pushed into the trenches by the blades as the apparatus is pulled along the terrain. While packing wheels are referred to herein and shown in various Figures for illustrative purposes, in at least one embodiment, apparatus 100 can include one or more other packing structures, whether separately or in combination with one or more wheels, such as slides, plates, arms and/or other structure(s) for packing soil as described herein.

Figure 5:
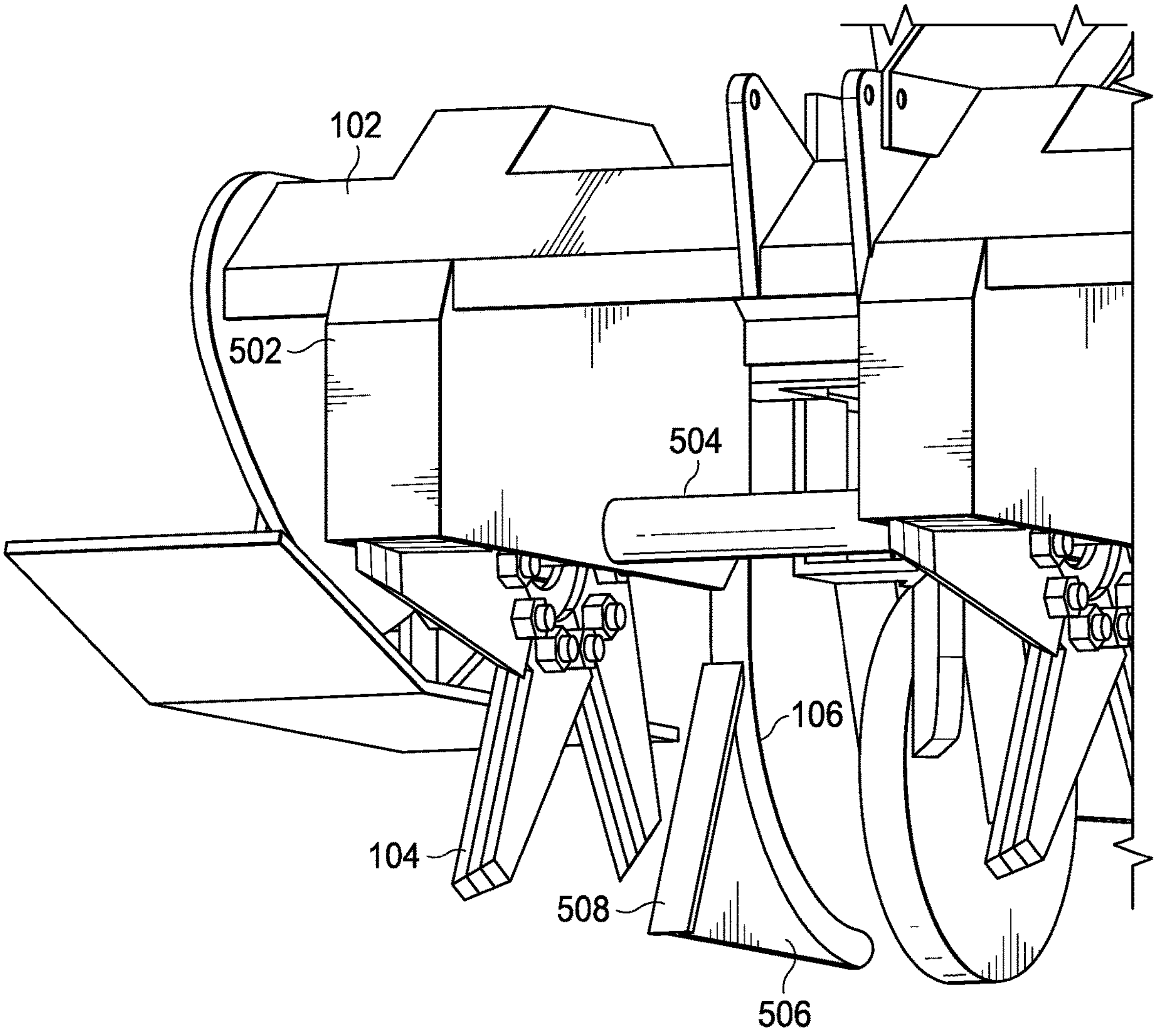
FIG. 5 depicts a front, lower perspective view of a shrouded trenching blade assembly under the subsurface tubing installation apparatus in accordance with an illustrative embodiment.

In an embodiment, rotation of the trenching blade assemblies 104 can be provided by a gearbox differential 118 through output shaft 128 and gearbox 130 to rotation shaft 504 (shown more clearly in FIG. 5). In the example shown, gearbox differential 118 comprises a single output differential in which power to transfer to only one output shaft 128 and gearbox 130. In an alternate embodiment (not shown) differential 118 might comprise a dual output T-shaped differential with second output shaft and gearbox symmetrically opposite shaft 128 and gearbox 130. In the present example, differential 118 is driven by drive shaft 124, which in turn might be driven by a power takeoff (PTO) in a tractor or similar vehicle pulling the installation apparatus 100. Alternatively, gearbox differential 118 might be hydraulically driven, or one or more hydraulic motors might supply power directly to the trenching blade assemblies in place of the power train formed by drive shaft 124 and differential 118.

The curved hose guides 106 and trench filler-packers 112 are connected to crossbar 114, which is coupled to the chassis 102 via end plates 122 at opposite ends of the chassis 102. Each curved hose guide 106 passes through a collar 132 in crossbar 114. Collars 132 serve to reinforce the curved hose guides 106 and prevent them from bending under load.

Figure 23:
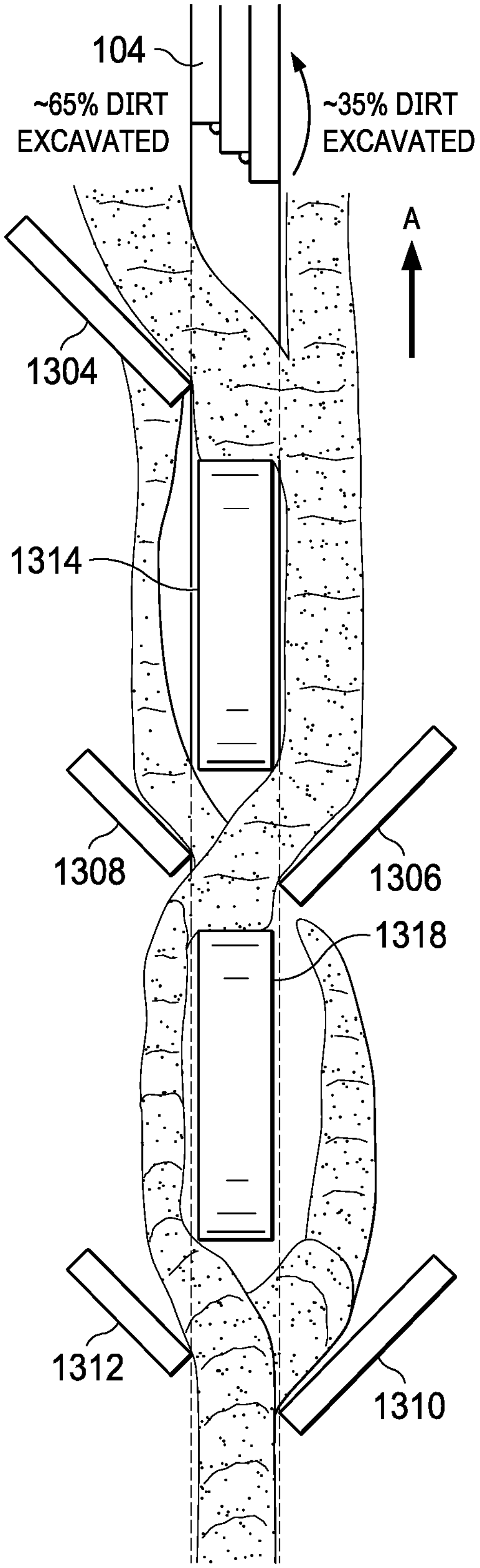
FIG. 23 illustrates refilling and packing soil into trenches in accordance with an illustrative embodiment.

Crossbar 114 can rotate on end plates 122, allowing the trench filler-packers 112 and hose guides 106 to be moved into an upright position, shown in FIG. 23, for storage as well as to reset the machine as it turns between passes during installation.

The depth at which the dripline is installed underground can be adjusted using dripline adjustment bars 120 on the sides of the chassis 102, which allow the chassis to rotate around height pivot hinges 126 connected to the ground slides 116. By changing the height/angle of the chassis 102 concurrently adjusts the depth of the trenching blade assemblies 104 and curved hose guides 106 and the height of the trench filler-packers 112. The depth of the trenches dug by the blade assemblies 104 might be adjusted, e.g., from one to five and eight inches, depending on the needed application. The ability to adjust the depth of the blade cut and dripline installation is particularly helpful for retrofit installations of existing fields or installation of a new field that will have additional dirt added to the top.

Figure 4:
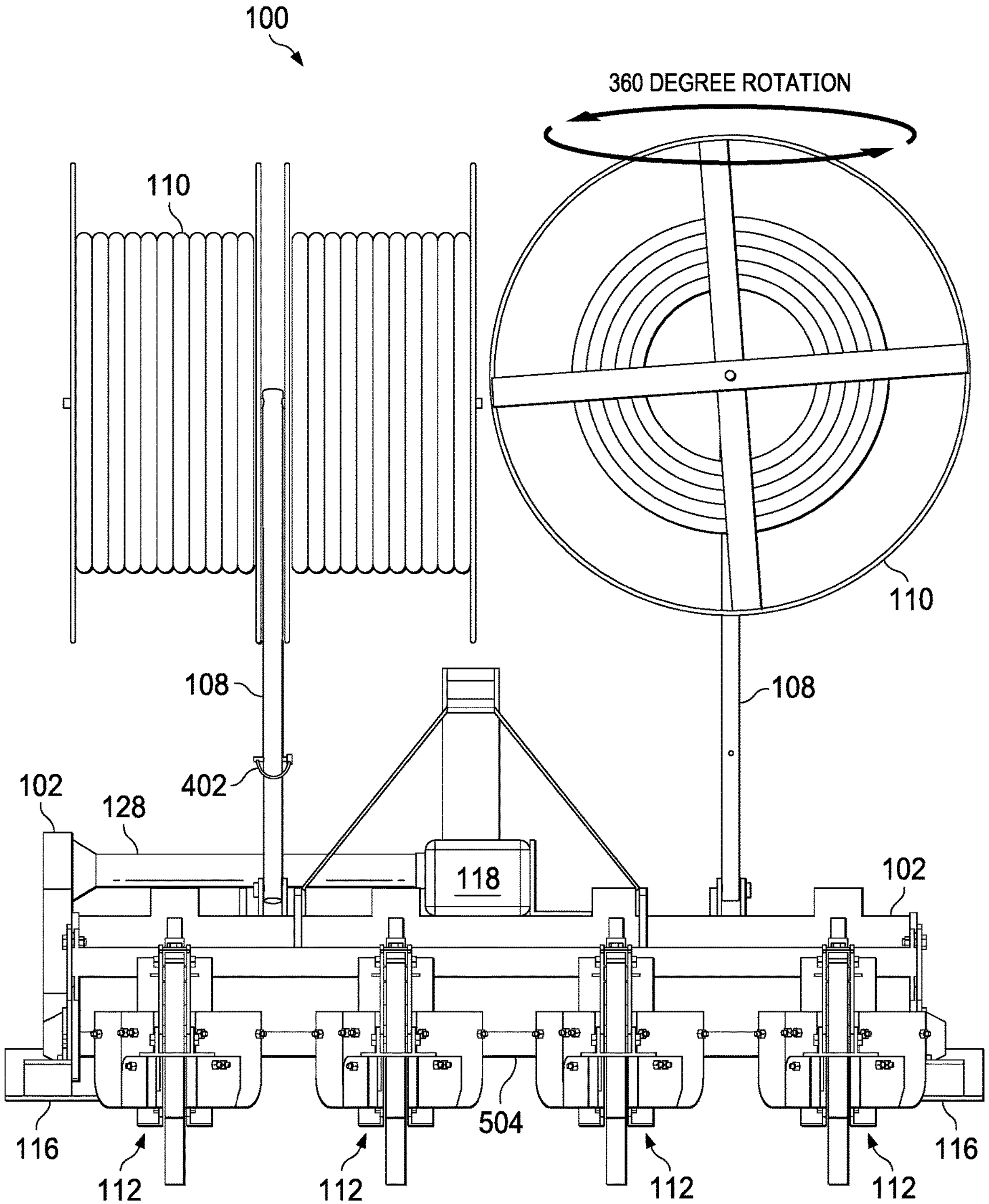
FIG. 4 depicts a back view of the subsurface tubing installation apparatus illustrating rotation of a tubing reel mount in accordance with an illustrative embodiment.

FIG. 4 depicts a back view of the subsurface tubing installation apparatus illustrating rotation of a tubing reel mount in accordance with an illustrative embodiment. The reel mounts 108 comprise swiveling T bar racks with a shaft that inserts into a sleeve. The reel mounts 108 can be fixed in position by means of a swivel pin 402. When the swivel pin 402 is removed, the reel mounts 108 can be swiveled within the sleeve, allowing 360° rotation. Rotating the reel mounts 108 permits installation and removal of the hose reels 110, particularly the inner reels.

FIG. 5 depicts a front, lower perspective view of a shrouded trenching blade assembly under the subsurface tubing installation apparatus in accordance with an illustrative embodiment. This view better illustrates the shroud 502 surrounding the trenching blade assembly 104. Also depicted is the drive shaft 504 that rotates the trenching blade assembly 104.

In an embodiment, trenching blade assembly 104 rotates in reverse, meaning forward from the ground up (i.e. the blade in contact with the ground rotates in the direction of arrow A in FIGS. 1-4). This reverse rotation of the blade assembly 104 allows the blades to "grab" the ground, pulling the apparatus 100 toward the ground to cut through it. In contrast, empirical testing indicates that a forward rotation (forward from the top down) has the possible effect of pushing up from the ground, thereby lifting the chassis rather than digging into the dirt, depending on soil conditions.

The efficiency with which the blade assemblies 104 dig into the ground affect the target speed for installing dripline or other flexible tubing. For example, the target rate of pulling the apparatus 100 along the terrain might be 0.5 mph. At that speed, with four trenching blade assemblies 104 and fours hose guides 106, the apparatus 100 could bury two miles of dripline per hour. The goal might be, e.g., to complete a 100,000 sq ft surface area in a single 24-hour period, or as soon as possible. With a tractor PTO speed of 540 RPM, the drive shaft 124 on the apparatus 100 rotates at 226 RPM. With six blades per blade assembly 104, that rotation speed translates to 1,356 blade impacts by per minute against the ground, at about 0.4 inches of soil removed per impact, which hits the target of 0.5+ mph. A 100,000 square foot field at 16 inches spacing between hose guides translates to 75,187 square ft. (14.2 miles) of dripline is to be buried. If a ground speed of 0.5 mph average is sustained, a surface area of 100,000 sq ft can be installed in approximately seven hours (14.2 miles/2 mph). In direct comparison, a rotor irrigation system install typical of prior art devices would take approximately three to five days to complete the same size field.

As shown in FIG. 5, a curved hose guide ("J-sweep") 106 trails the trenching blade assembly. Each hose guide 106 comprises a J-shaped tube with an input aperture configured to receive hose from a hose reel 110 and an output aperture from which the hose exits the hose guide into a trench. A gusset 506 supports the J shaped tube and includes an angled plate 508 opposite the J shaped tube. Gusset 506 is configured to prevent the J-sweep 106 from bending under pressure. The plate (lift ramp) 508 is configured to lift loose soil left behind by the trenching blade assembly 104 out of the trench before the hose is deposited in the trench.

FIGS. 6-10 depict different views of a trenching blade assembly 104 in accordance with an illustrative embodiment. As shown for illustrative purposes, each blade assembly 104 comprises a circular flange 804 with a central hole configured to fit over a shaft, shown most clearly in the right and left side views shown in FIGS. 8 and 9, respectively. The flange 804 might be welded to the rotating shaft 504. A number of trenching blades 802 are mounted radially around the circumference of the circular flange 804. In the present example, six blades 802 are coupled to a flange mount 804 to form a single trenching blade assembly 104. However, a higher or lower number of blades can be used according to application requirements. Each blade 802 might comprise three ⅜-inch thick plates (AR/T5) stacked with vertical and horizontal offsets.

Trenching blades 802 are designed to cut the ground and dig trenches at a linear rate of speed. The blades provide mechanical advantage to obtain speeds of up to 0.5+ mph as explained above, depending on soil conditions.

Each trenching blade 802 comprises a tip with a sloped thickness cross-section to shear the ground, cutting the trench on both the x and y axes. Each blade 802 is sloped on both the perpendicular axis (indicated by arrow B in FIG. 6) and the horizontal axis (indicated by arrow C in FIG. 8). As the blade moves through the dirt sheer forces work up the blade to the flange mount 804. The slopes allow shear on the perpendicular and horizontal axes, which enhances the speed at which the blades can dig a trench compared to a blade without the slopes.

Figure 6:
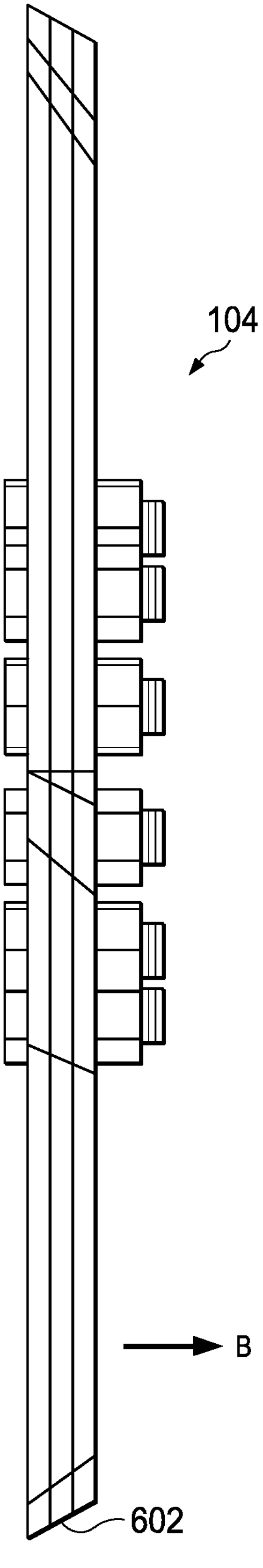
FIG. 6 depicts a front view of a trenching blade assembly for the subsurface tubing installation apparatus in accordance with an illustrative embodiment.
Figure 7:
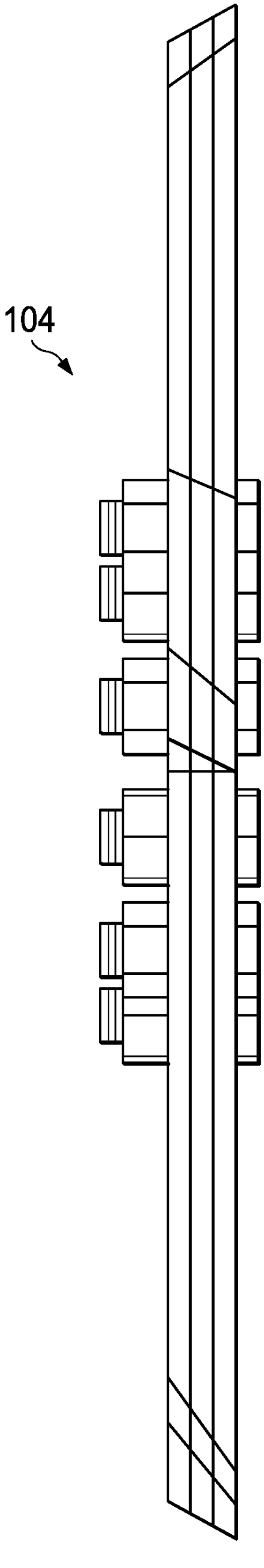
FIG. 7 depicts a rear view of a trenching blade assembly for the subsurface tubing installation apparatus in accordance with an illustrative embodiment.
Figure 8:
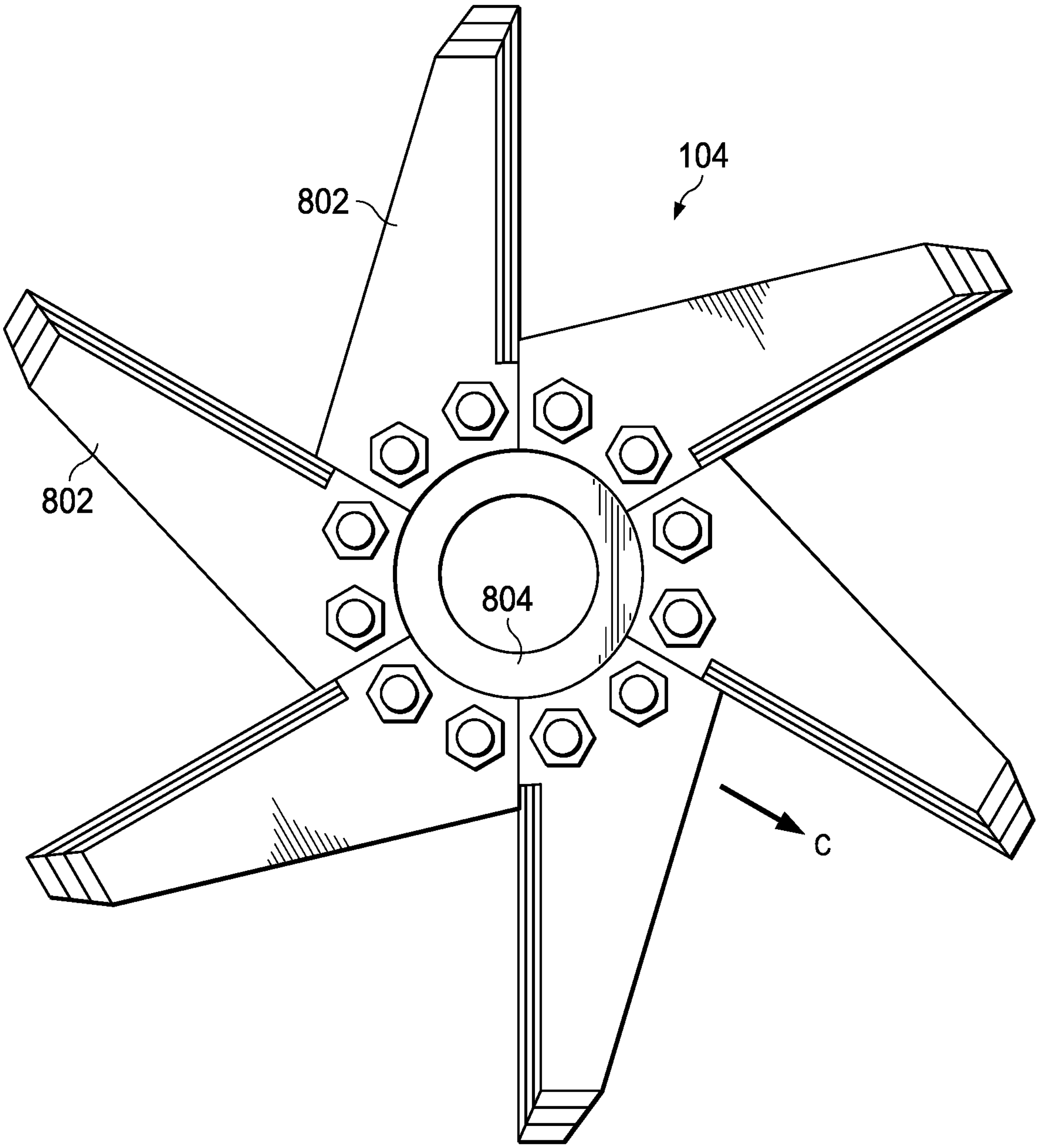
FIG. 8 depicts a right, side view of a trenching blade assembly for the subsurface tubing installation apparatus in accordance with an illustrative embodiment.
Figure 9:
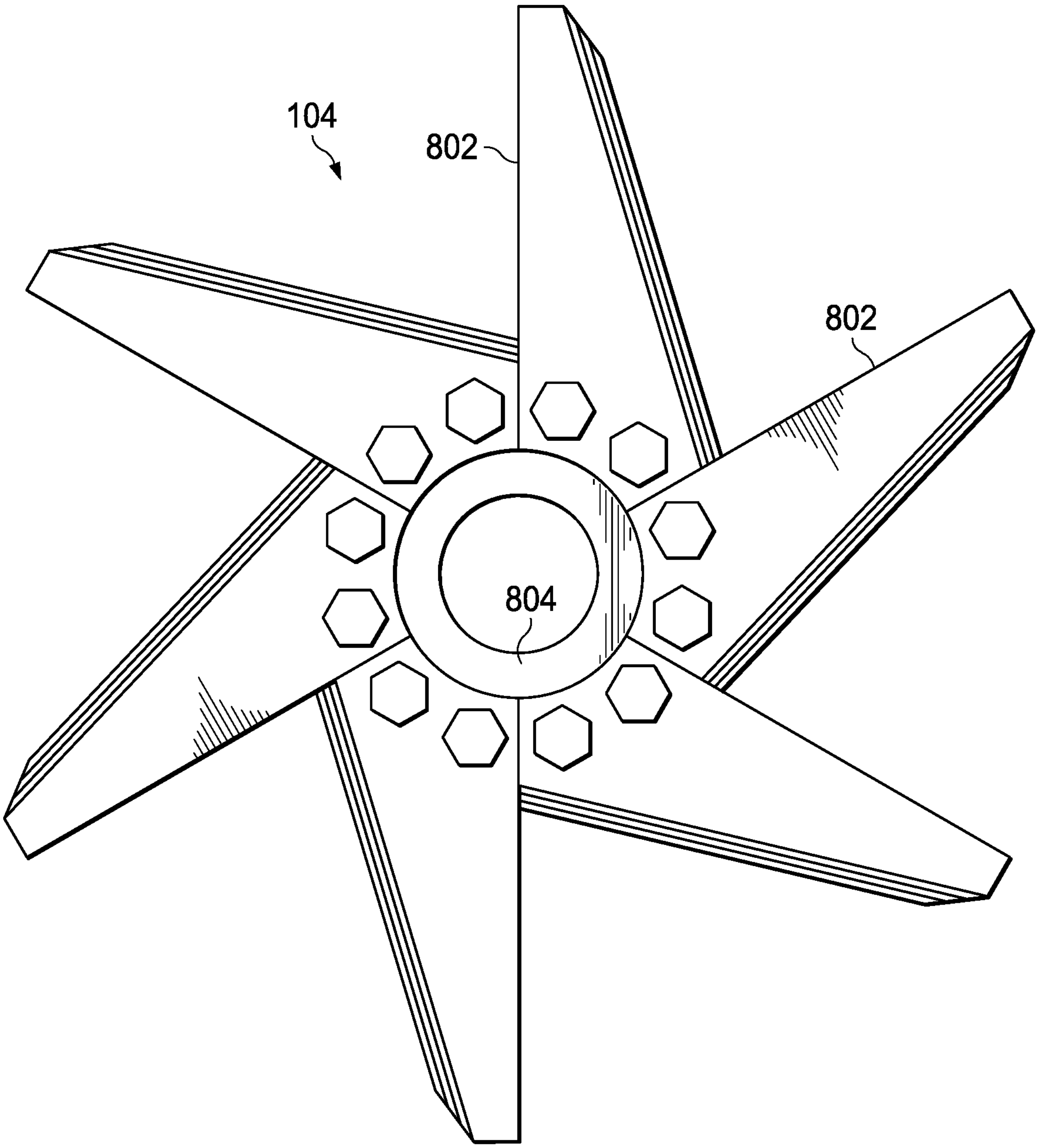
FIG. 9 depicts a left, side view of a trenching blade assembly for the subsurface tubing installation apparatus in accordance with an illustrative embodiment.
Figure 10:
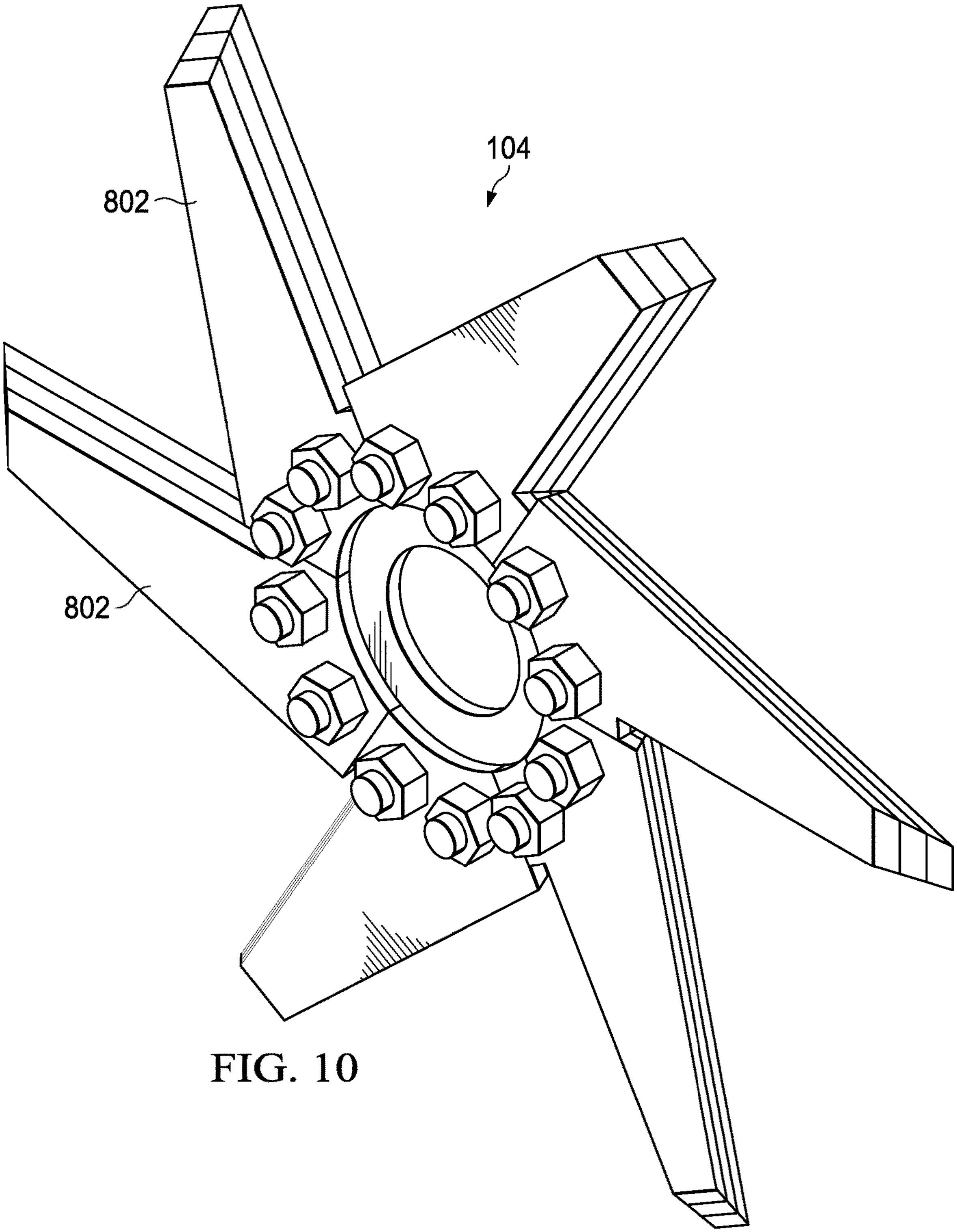
FIG. 10 depicts a rear perspective view of a trenching blade assembly for the subsurface tubing installation apparatus in accordance with an illustrative embodiment.

The slope 602 along the perpendicular axis causes approximately 65% of the soil excavated from the trench to be deposited to the right of the blade in the direction of the slope, indicated by arrow B in FIG. 6. By depositing the majority of excavated soil to one side of the trench, over half the excavated soil can be pushed back into the trench by the first passing soil blade on the trench filling attachment (described in detail below).

The design of trenching blade assembly 104 can be used with multiple applications in addition to dripline installation, such as, e.g., trench digging for flexible pipe. The only difference would be dimensions (e.g., flange size, blade width and length), but the design and proportions would remain the same for single and multi-row configurations.

Figure 11:
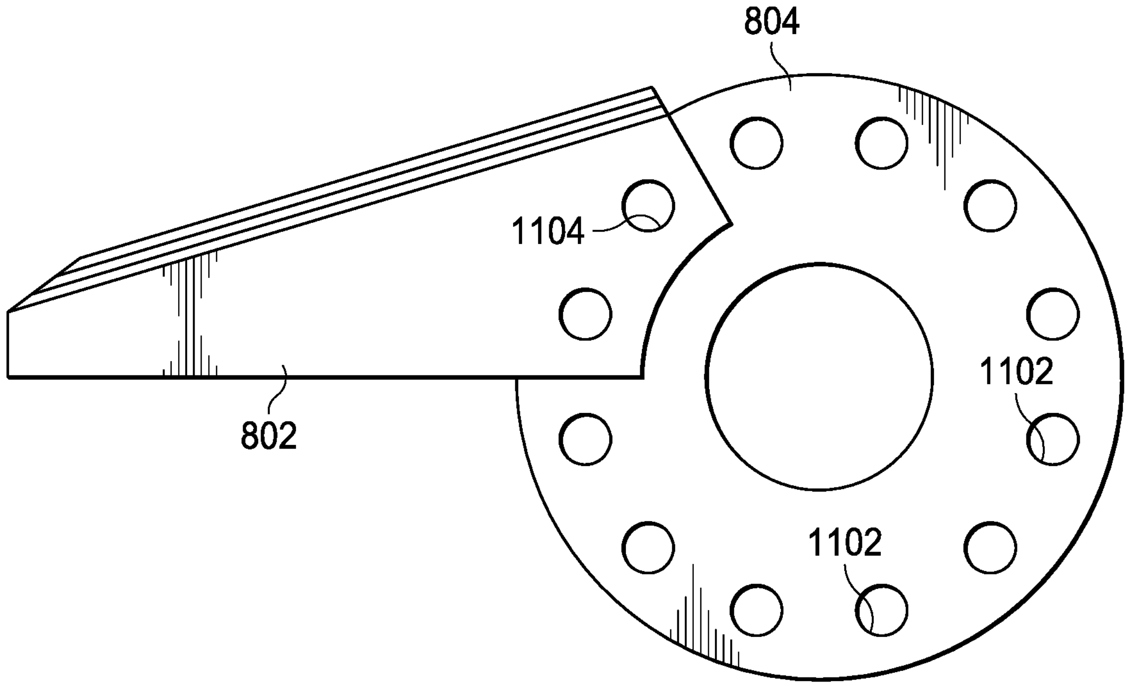
FIG. 11 depicts a flange mount for a trenching blade assembly for the subsurface tubing installation apparatus in accordance with an illustrative embodiment.

FIG. 11 depicts a flange mount for a trenching blade assembly for the subsurface tubing installation apparatus in accordance with an illustrative embodiment. Flange mount 804 comprises a number of bolt holes 1102 around its circumference. In the illustrated example, each trenching blade 802 comprises two corresponding bolt holes 1104 that align with the bolt holes 1104 in the flange mount 804, allowing the blades to be secured in place with nuts and bolts, as shown in FIGS. 6-10. Securing the separate blades 802 to the flange 804 via bolts allows for the blades to be replaced individually as needed.

Figure 12:
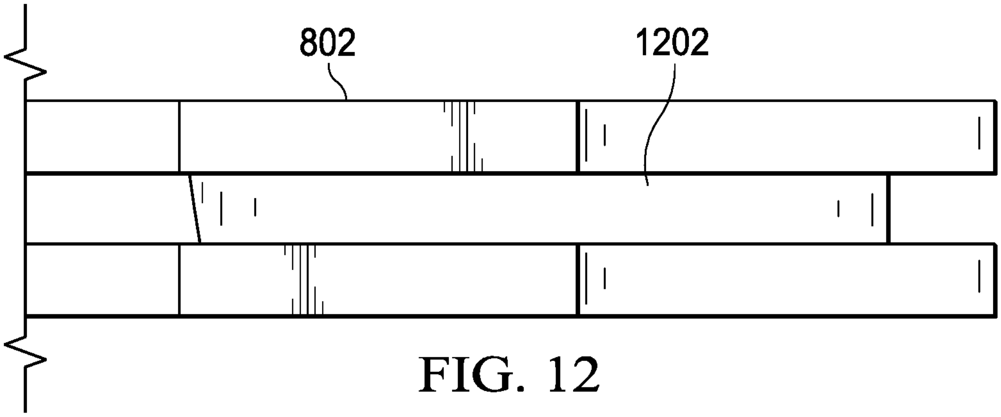
FIG. 12 depicts a groove in a trenching blade for coupling to a flange mount of a trenching blade assembly in accordance with an illustrative embodiment.
Figure 14:
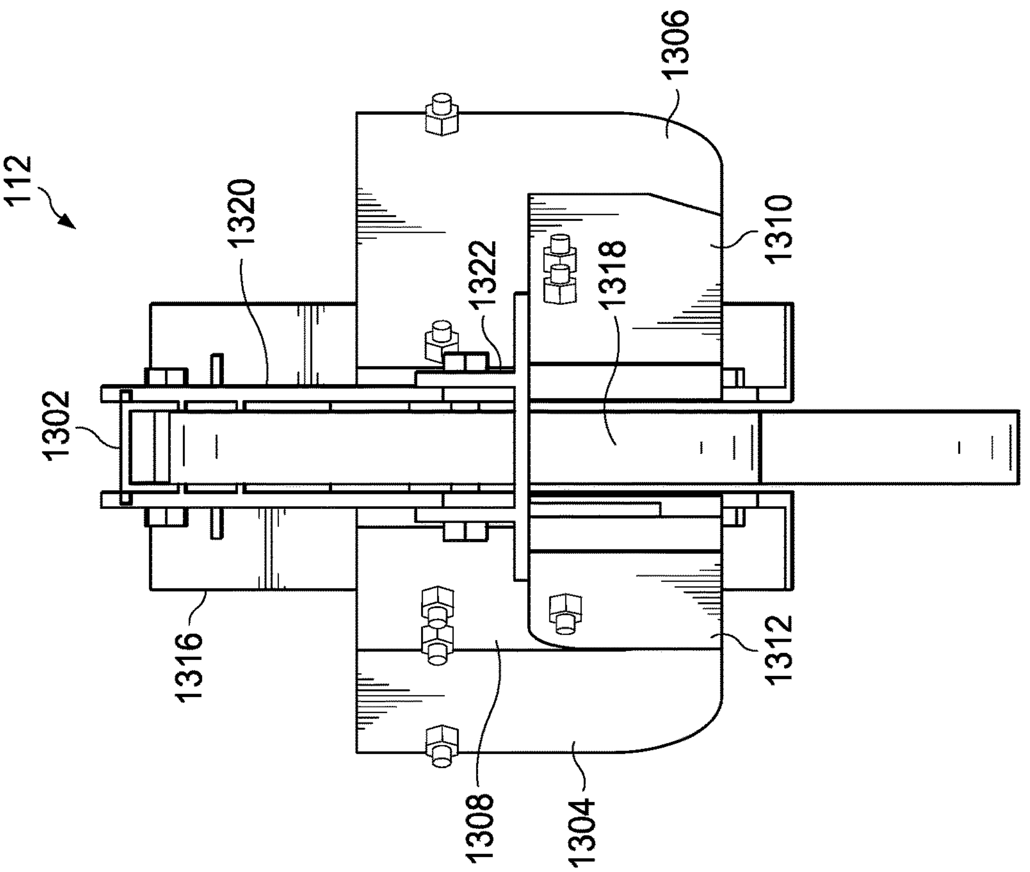
FIG. 14 depicts a rear view of a soil grading and packing device attachment of a subsurface tubing installation apparatus in accordance with an illustrative embodiment.
Figure 13:
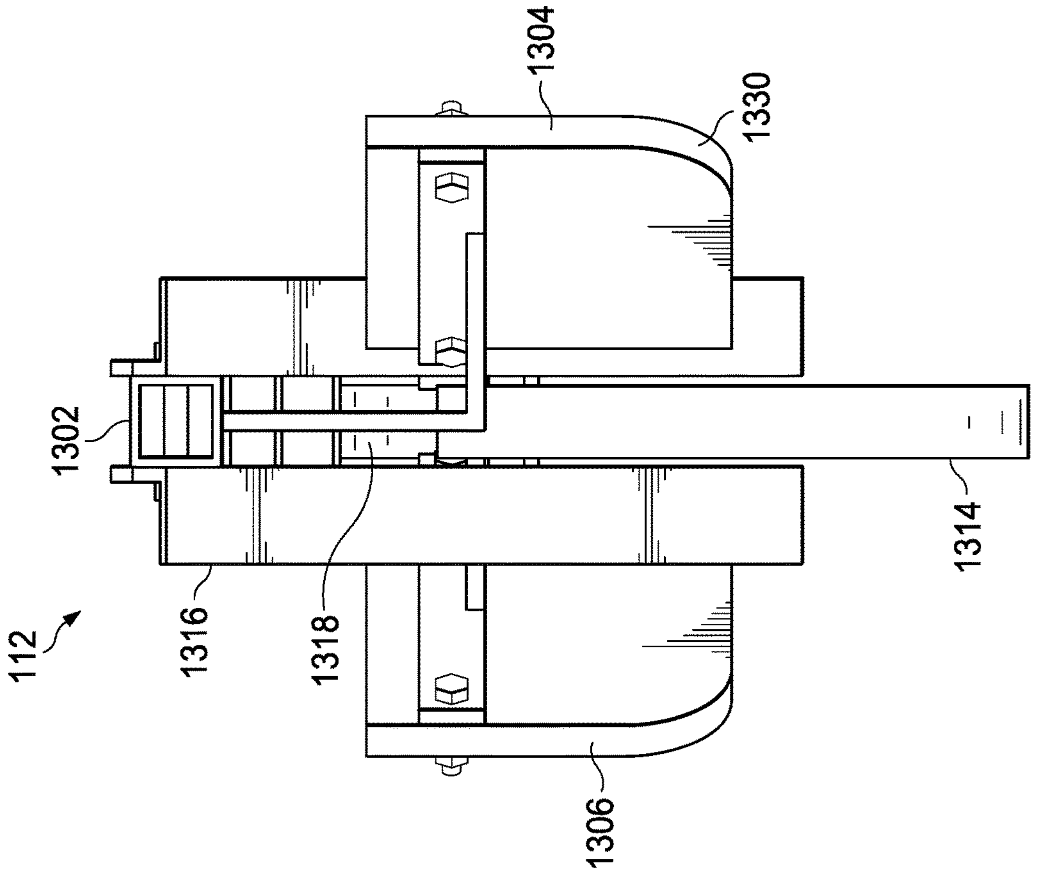
FIG. 13 depicts a front view of a soil grading and packing device attachment of a subsurface tubing installation apparatus in accordance with an illustrative embodiment.
Figure 15:
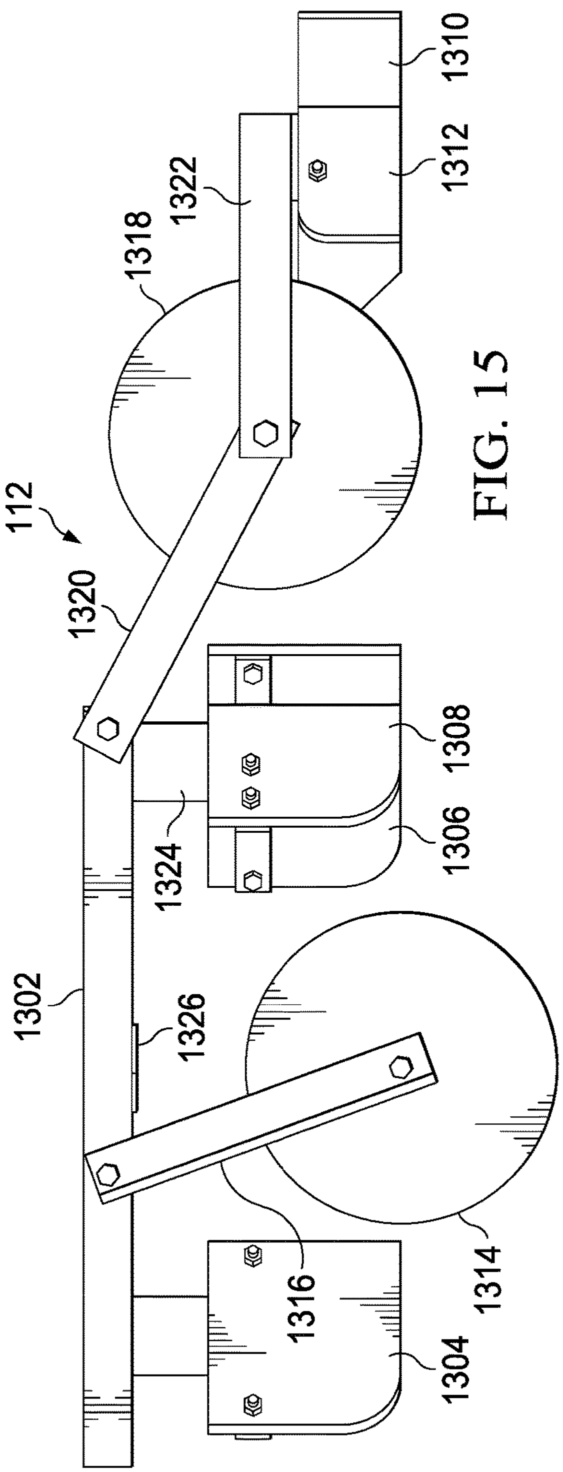
FIG. 15 depicts a right view of a soil grading and packing device attachment of a subsurface tubing installation apparatus in accordance with an illustrative embodiment.
Figure 16:
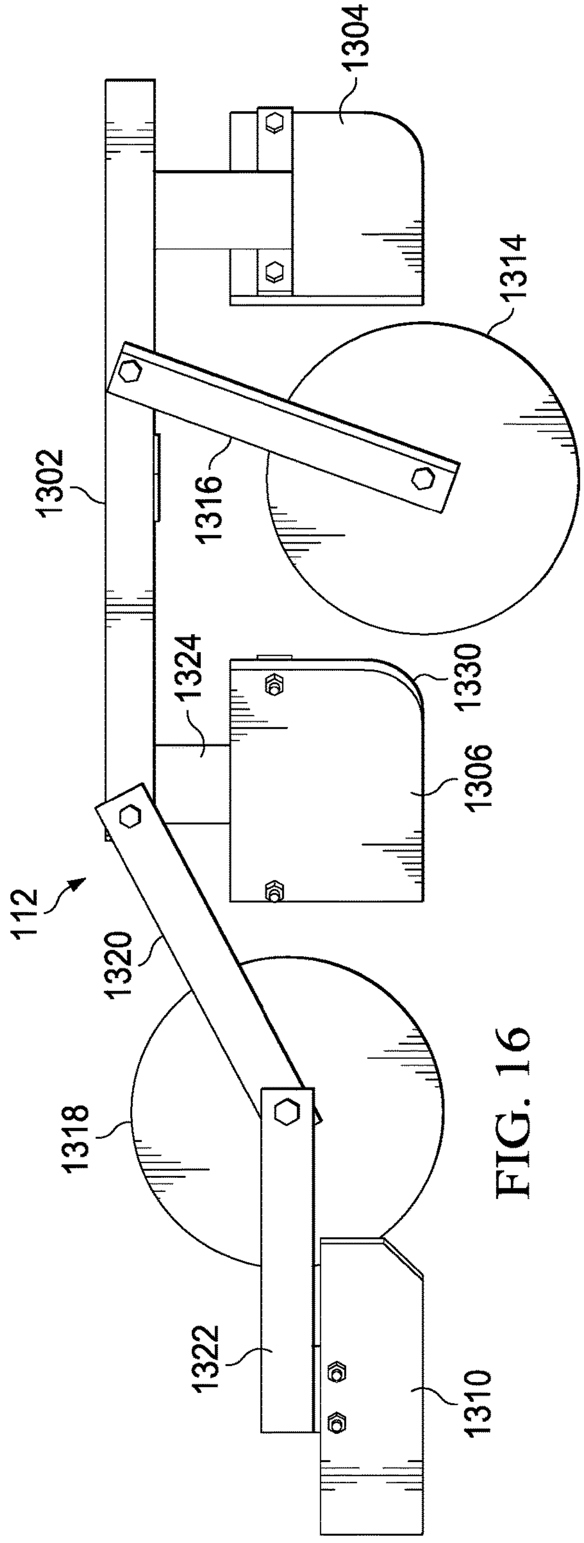
FIG. 16 depicts a left view of a soil grading and packing device attachment of a subsurface tubing installation apparatus in accordance with an illustrative embodiment.
Figure 17:
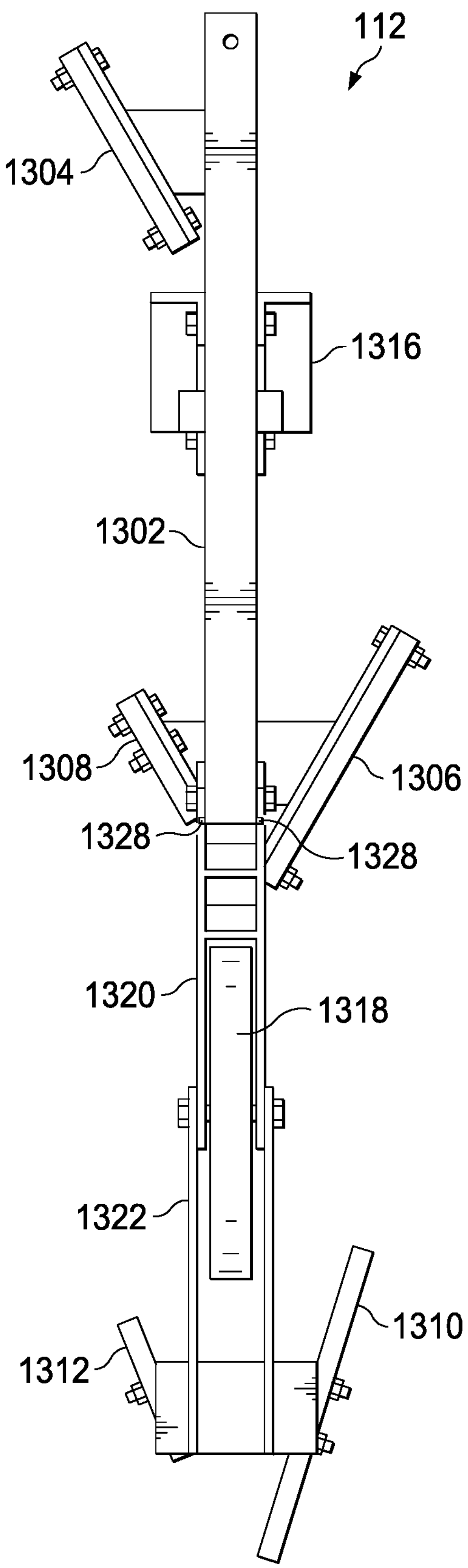
FIG. 17 depicts a top view of a soil grading and packing device attachment of a subsurface tubing installation apparatus in accordance with an illustrative embodiment.
Figure 18:
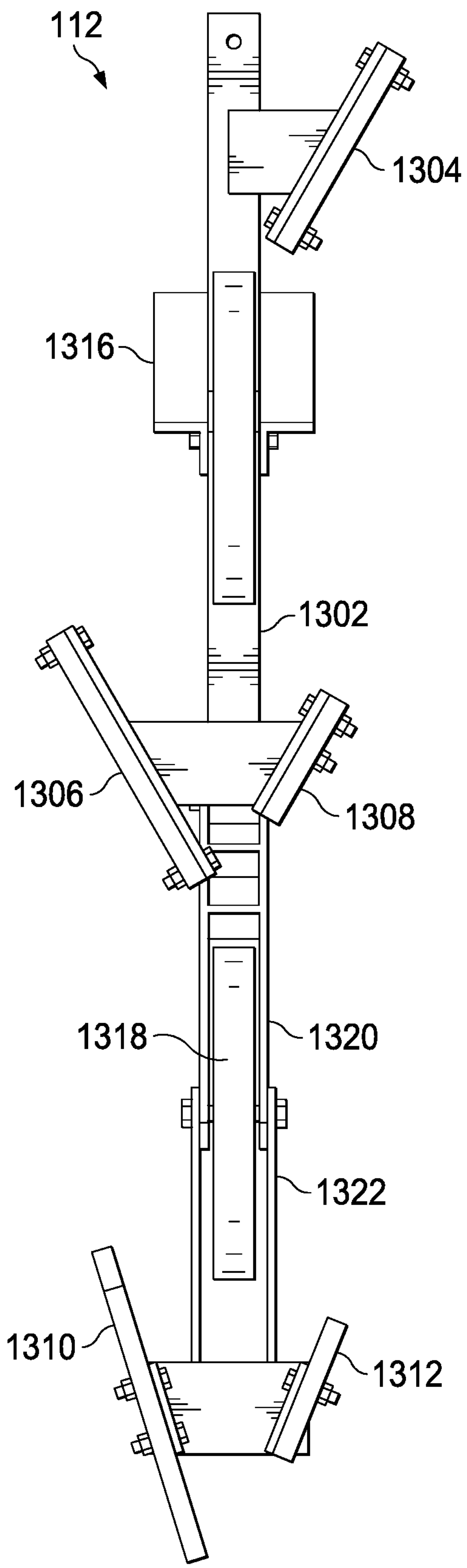
FIG. 18 depicts a bottom view of a soil grading and packing device attachment of a subsurface tubing installation apparatus in accordance with an illustrative embodiment.
Figure 19:
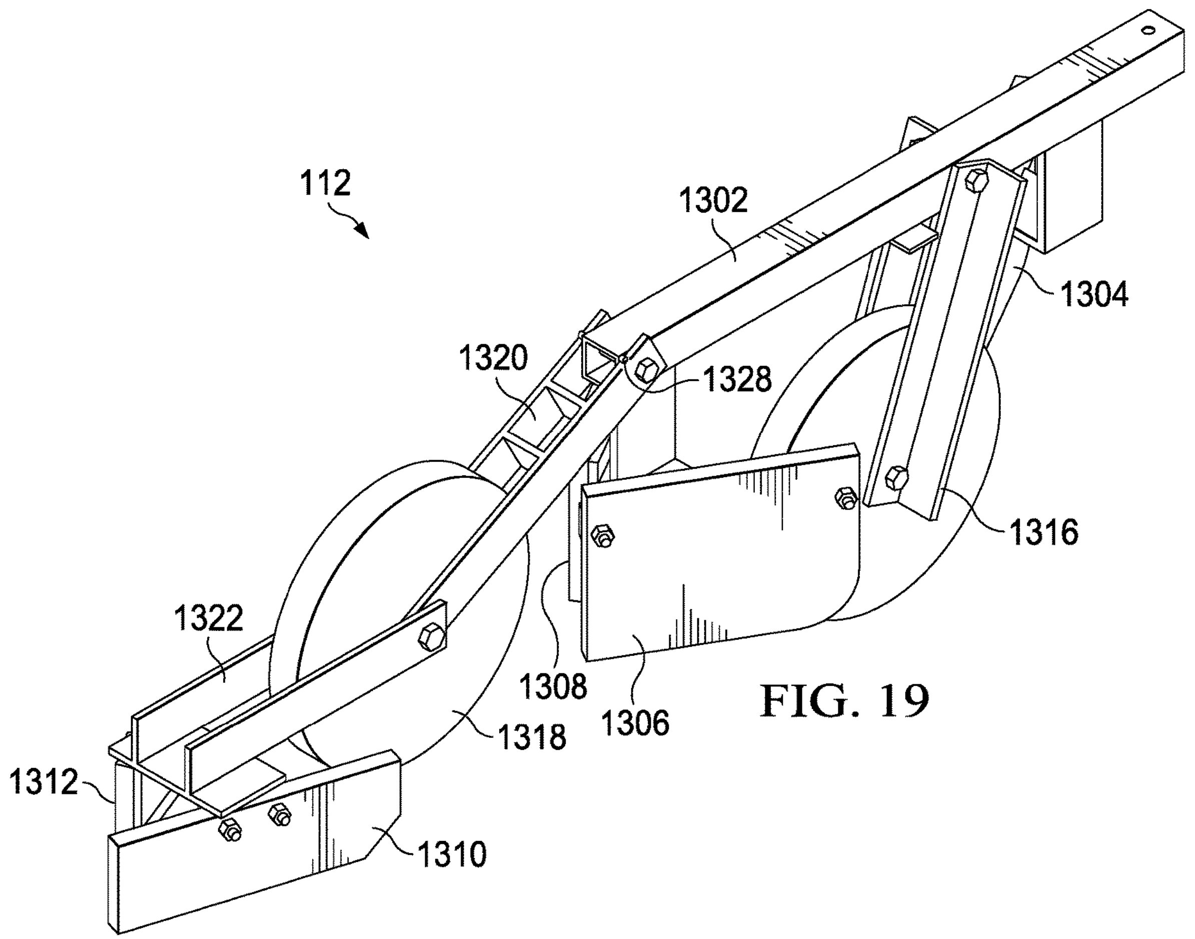
FIG. 19 depicts a top perspective view of a soil grading and packing device attachment of a subsurface tubing installation apparatus in accordance with an illustrative embodiment.

FIG. 12 depicts a groove 1202 in a trenching blade 802 for coupling to a flange mount of a trenching blade assembly in accordance with an illustrative embodiment. Groove 1202 is curved to match the circumference of the flange, allowing a close conformal fit of the blade to the flange.

FIGS. 13-20 depict different views of a trench filler-packer 112 (soil grading and packing device) in accordance with an illustrative embodiment. Each trench filler-packer 112 comprises a number of offset blades (also known as soil grades) that push excavated soil back into a trench over deposited dripline hose. Interspersed with the soil grades are packing wheels that pack down the returned soil in the trench.

In the example shown in FIGS. 13-20 the trench filler-packer 112 comprises a fixed central shaft 1302 that can be coupled to the crossbar 114 on the chassis 102. When connected to chassis 102, central shaft 1302 is aligned with a corresponding J-sweep and trenching blade assembly.

A first blade 1304 is connected to shaft 1302 and is angled outward to the right of the centerline of shaft 1302 toward the chassis. The first blade 1304 might be referred to has a main soil grade. Trailing behind blade 1304 is a first packing wheel 1314. First packing wheel 1314 is connected to shaft 1302 by a swinging arm 1316. Brace 1326 welded on central shaft 1302 limits how high swing arm 1316 can swing, thereby assisting the first packing wheel 1314 in packing down soil and preventing the soil from pushing the wheel away.

Trailing behind the first packing wheel 1314 are a second blade 1306 and third blade 1308 on opposite sides of the centerline. In an embodiment, blades 1306 and 1308 are approximately ⅛ of an inch on each side of the trench to push as much soil back into the trench as possible but with enough clearance to avoid problems getting stuck in the trench. Blade 1306 is angled outward to left of the centerline toward the chassis, and blade 1308 is angled outward to the right toward the chassis. Blade 1306 is also a main soil grade like blade 1304, having approximately the same length. Blade 1308 may be referred to as a mini soil grade with a length shorter than that of a main soil grade such as blades 1304 and 1306.

Figure 22:
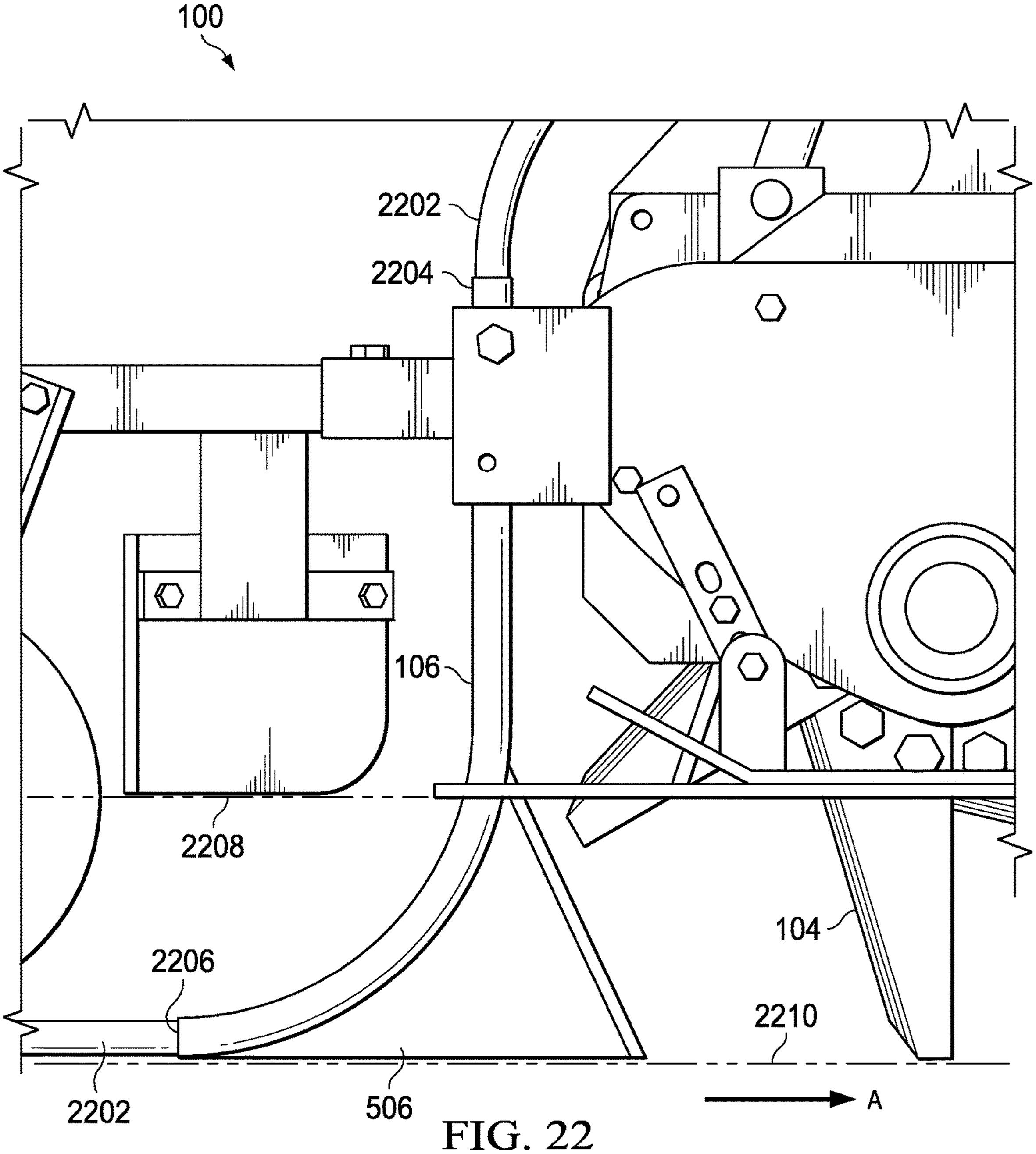
FIG. 22 illustrates subsurface installation of tubing in accordance with an illustrative embodiment.

Second blade 1306 and third blade 1308 are offset from each other, wherein a gap exists between the distal (from the chassis) ends of the blades, allowing soil to pass between them to prevent clogging, shown more clearly in FIG. 22. The positions of the blades 1306, 1308 can be adjusted forward or back on the mount 1324 to change the offset space between them.

A second packing wheel 1318 trails behind the second blade 1306 and third blade 1308. Second packing wheel 1318 is coupled to the distal (from the chassis) end of the central shaft 1302 by a second swing arm 1320. Similar to brace 1326, tack weld 1328 at the distal end of central shaft 1302 that limits the upward rotation of second swing arm 1320, thereby helping pack the soil.

Trailing the second packing wheel 1318 are a fourth blade 1310 and a fifth blade 1312. Fourth blade 1310 is a main soil grade and is angled outward to the left toward the chassis like second blade 1306. Fifth blade 1312 opposite the centerline from fourth blade 1310 is another mini grade angled outward to right of the centerline toward the chassis. Fourth blade 1310 and fifth blade 1312 are also offset at their distal ends to prevent clogging and can also be adjusted to increase or decrease the offset distance. The fourth blade 1310 and fifth blade 1312 are connected to a third swing arm 1322 that is connected to the axel passing through the second packing wheel 1318.

As shown in the figures, the lower leading edge 1330 of the blades might be rounded to prevent ground scarring.

The soil grade blades 1304, 1306, 1308, 1310, 1312 and packing wheels 1314, 1318 might be made from a durable thermoplastic polymer such as high-density polyethylene (HDPE). HDPE prevent soil from sticking to and gumming up the blades and packing wheels.

Figure 21:
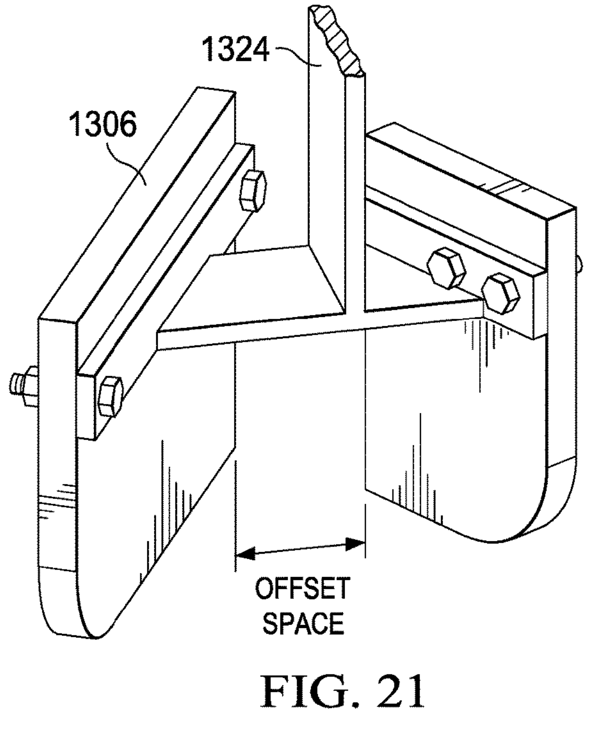
FIG. 21 depicts the offset between soil grade blades of the trench filling attachments in accordance with an illustrative embodiment.
Figure 20:
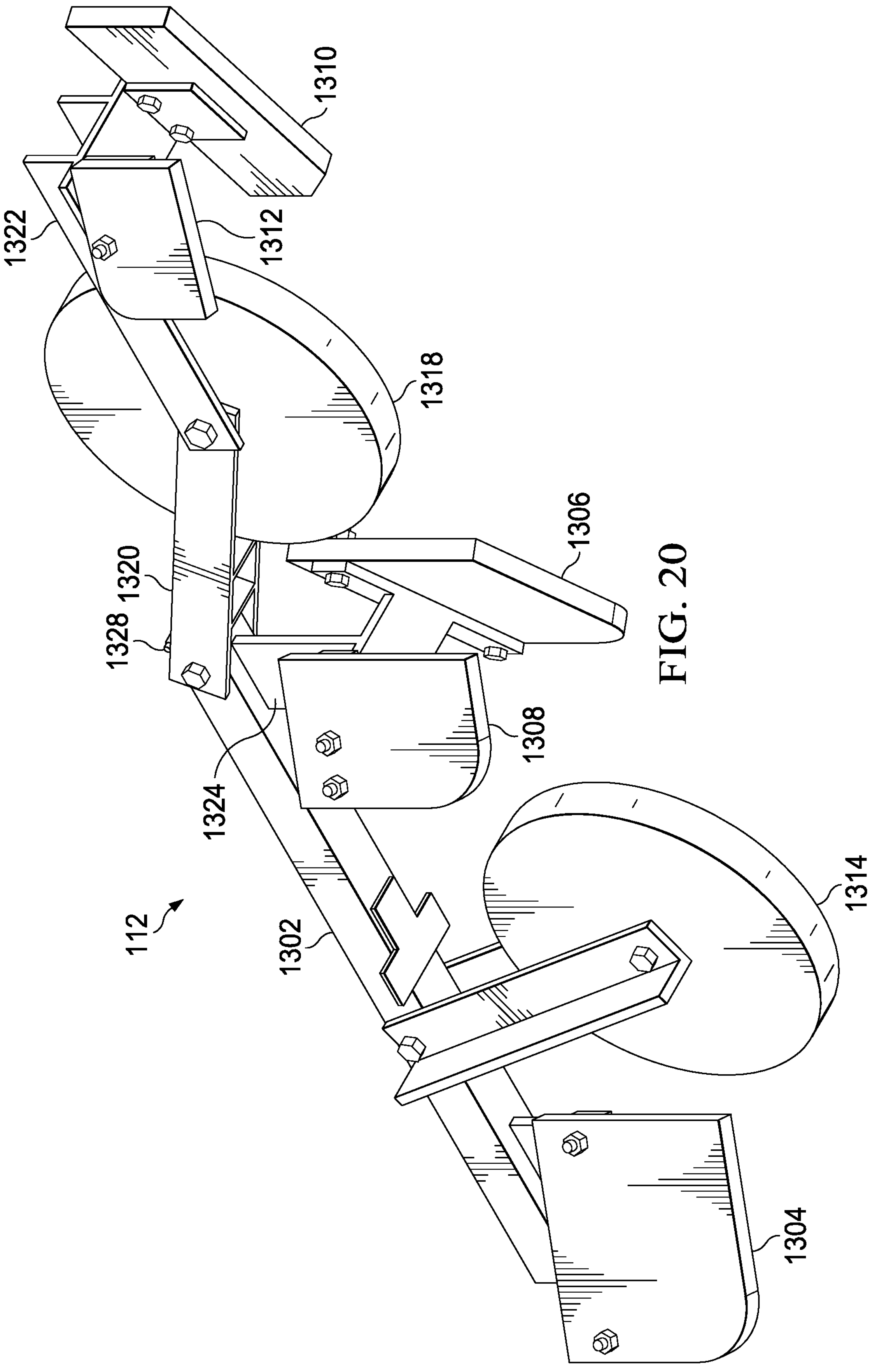
FIG. 20 depicts a bottom perspective view of a soil grading and packing device attachment of a subsurface tubing installation apparatus in accordance with an illustrative embodiment.

FIG. 21 depicts the offset between soil grade blades of the trench filling attachments in accordance with an illustrative embodiment.

FIG. 22 illustrates subsurface installation of tubing in accordance with an illustrative embodiment. As installation apparatus 100 is pulled over the ground surface 2208 in the direction of arrow A, trenching blade assemblies 104 dig trenches in the soil. The angled lift ramp 508 of the J-sweep hose guide 106 pushes remaining soil out of the trench as it moves forward.

Dripline 2202 is fed from a hose reel 110 into the input aperture 2204 of J-sweep 106. The dripline 2202 emerges from the output aperture 2206 of the J-sweep and is deposited on the bottom of the trench 2210.

FIG. 23 illustrates refilling and packing soil into trenches in accordance with an illustrative embodiment. As the dripline is deposited into the trench, the trench is immediately refilled with soil to bury the dripline.

Because of the slope in the ends of the trenching blades, the soil is deposited predominantly to the side of the slope. In the present example, as the tractor pulls the apparatus in the direction of arrow A approximately 65% of the excavated dirt is deposited to the left (in the picture). The first soil grade blade 1304 pushes dirt back into the trench.

As the first packing wheel 1314 rolls over the redeposited dirt, excess dirt is pushed to the right side. The second main soil grade 1306 catches the overflow soil with the assistance of mini soil grade 1308 and pushes it back into the trench before the second packing wheel 1318 passes over it.

After the second packing wheel 1318 passing over the trench, the remnants of soil not caught by the first three soil grades 1304, 1306, 1308 are caught by the last two blades 1310. 1312 and pushed into the trench. The offset between the blades allows the dirt/soil to flow without getting clogged.

The soil grade blades and packing wheels push and pack the excavated soil back into the trench in a serpentine manner by grading left to right, packing the soil, then grading right to left, etc. The alternating soil grades have the effect of sweeping the soil from different directions to move it into the trench, analogous to sweeping dirt into a central pile with a broom. The soil grades rely on their respective angles and being successively dragged over the same spot to gather as much soil as possible. The soil grades have no moving parts, thereby reducing the chances of mechanical failure or malfunction and enhancing durability.

Figure 24:
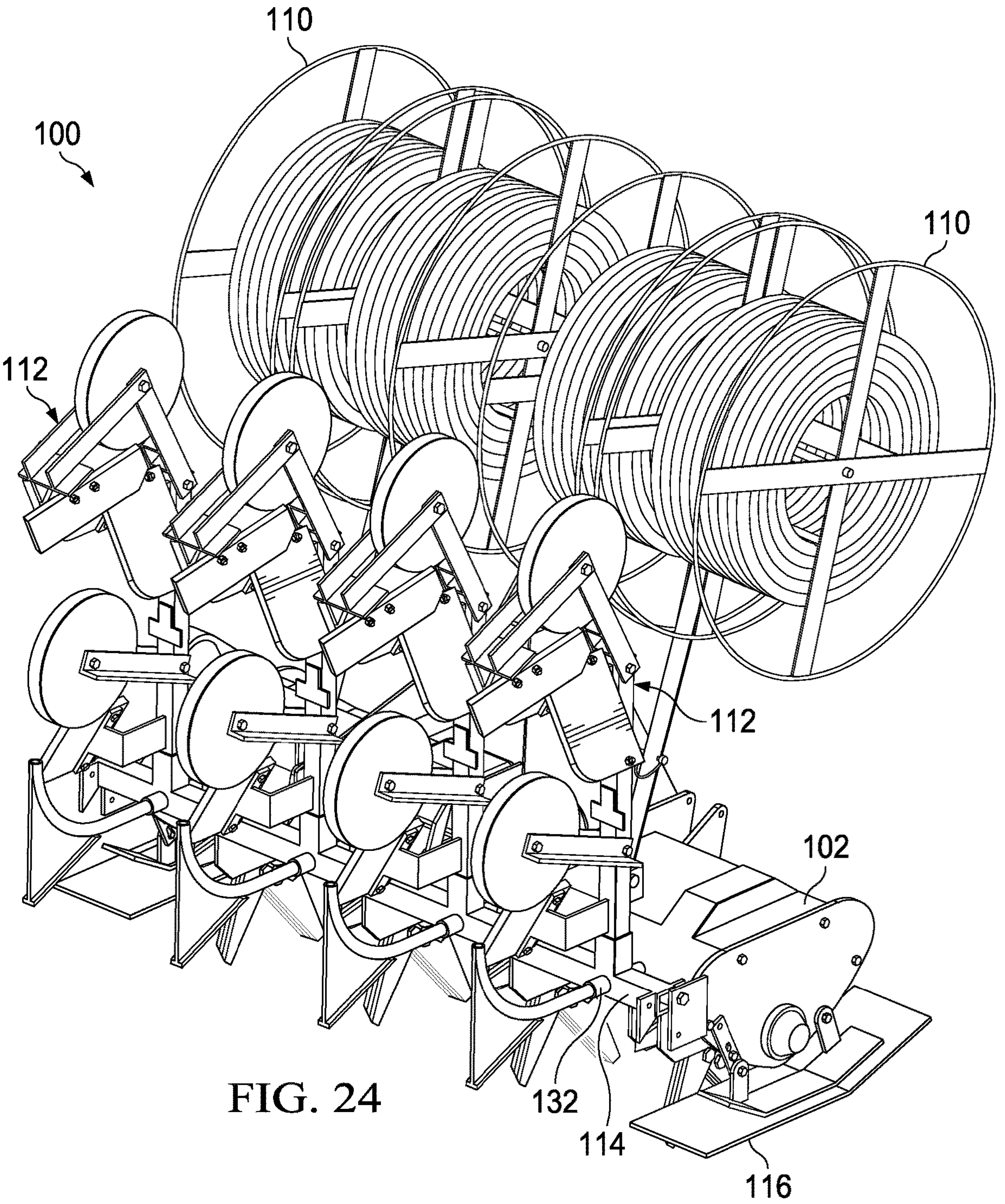
FIG. 24 depicts a subsurface tubing installation apparatus in a raised position in accordance with an illustrative embodiment.

FIG. 24 depicts a subsurface tubing installation apparatus in a raised position in accordance with an illustrative embodiment. This raise position can be used as the apparatus is turning between passes on a field during installation. It can also be used for stowing away the apparatus between uses.

In at least one embodiment, an apparatus according to the disclosure can include a chassis, a trenching blade assembly comprising one or more trenching blades coupled to the chassis and configured to dig a trench in terrain, a reel mount in operable communication with the chassis, wherein the reel mount can be configured to hold a reel of hose, a hose guide connected to the chassis, wherein the hose guide can be configured to guide hose into the trench, and a trench filler-packer connected to the chassis, wherein the trench filler-packer can be configured to dispose soil excavated from the trench back into the trench and to pack at least a portion of the soil disposed back into the trench. In at least one embodiment, a trench filler-packer can include one or more blades, which can be disposed at one or more angles, such as relative to a centerline of a trench and/or a component of the apparatus.

In at least one embodiment, an apparatus can be configured to, in a single pass, dig one or more trenches, dispose hose into one or more trenches, dispose soil excavated from one or more trenches back into the trenches, and pack at least a portion of the soil disposed back into the trenches. In at least one embodiment, a method can include in a single pass, digging one or more trenches, disposing hose into one or more trenches, disposing soil excavated from one or more tranches back into one or more trenches, and packing at least a portion of the soil disposed back into the one or more trenches.

In at least one embodiment, an apparatus according to the disclosure can include one or more packing wheels. At least one of the one or more packing wheels can be disposed in trailing relation to at least one of the one or more blades. One or more blades of the trench filler-packer can include a plurality of blades disposed at one or more angles, which can be or include different angles. In at least one embodiment, a plate can be coupled to the chassis rearwardly of the trenching blade assembly, and the plate can be configured to route soil out of the trench. In at least one embodiment, one or more plates can be coupled to a hose guide.

In at least one embodiment, a reel mount can be coupled to the chassis and can include a support bar, and the reel mount can be configured to selectively rotate such as about a central longitudinal axis of the support bar or another axis. In at least one embodiment, a reel mount can be hingedly coupled to the chassis and configured to selectively rotate, such as forwards and backwards among two or more positions. In at least one embodiment, one or more trenching blades can be rotateably coupled to the chassis. In at least one embodiment, a depth or other position of a trenching blade assembly can be adjustable relative to a surface of the terrain for selectively adjusting the depth of the trench. In at least one embodiment, at least one of a hose guide and a trench filler-packer can be configured to be positioned simultaneously with one another and/or one or more other components, such as a trenching blade assembly.

In at least one embodiment, one or more slides can be rotateably coupled to the chassis. In at least one embodiment, a hose guide can include a hose inlet and a hose outlet, and the hose outlet can be configured to be disposed in a trench, such as rearwardly of one or more trenching blades. In at least one embodiment, one or more reels of hose can be coupled to a reel mount.

In at least one embodiment, an apparatus according to the disclosure can include a chassis, a trenching blade assembly comprising one or more trenching blades coupled to the chassis and configured to dig a trench in terrain, a reel mount in operable communication with the chassis, wherein the reel mount can be configured to hold a reel of hose, a hose guide connected to the chassis, wherein the hose guide can be configured to guide hose into the trench, and a trench filler-packer connected to the chassis, wherein the trench filler-packer can be configured to dispose soil excavated from the trench back into the trench via one or more blades, such as blades disposed rearwardly of one or more trenching blades, and to pack at least a portion of the soil disposed back into the trench. In at least one embodiment, an apparatus can be configured to, in a single pass, dig one or more trenches, dispose hose into one or more trenches, dispose soil excavated from one or more trenches back into one or more trenches, and pack at least a portion of soil.

In at least one embodiment, an apparatus according to the disclosure can include a chassis, first and second trenching blade assemblies, each trenching blade assembly comprising one or more trenching blades coupled to the chassis, wherein the first and second trenching blade assemblies are configured to dig first and second trenches, respectively, in terrain, one or more reel mounts in operable communication with the chassis, one or more reels or other sources of hose, first and second hose guides connected to the chassis and configured to guide hose into the first and second trenches, respectively, and first and second trench filler-packers connected to the chassis. In at least one embodiment, the first and second trench filler-packers can be configured to dispose soil excavated from the first and second trenches, respectively, back into the trenches, such as via one or more blades. In at least one embodiment, one or more blades can be disposed rearwardly of one or more trenching blades. In at least one embodiment, an apparatus can be configured to pack at least a portion of soil disposed back into one or more trenches. In at least one embodiment, an apparatus can be configured to, in a single pass, dig a plurality of trenches, dispose hose into one or more trenches, dispose soil excavated from one or more trenches into one or more trenches, and pack at least a portion of soil in one or more trenches.

In at least one embodiment, one or more trench filler-packers can include a plurality of blades disposed at one or more angles, such as for directing soil into one or more trenches. In at least one embodiment, one or more plates can be coupled to the chassis, such as rearwardly of one or more trenching blade assemblies, and can be configured to route soil out of one or more trenches.

In at least one embodiment, an apparatus for installing multiple strands of hose simultaneously, such as below a surface of terrain, according to the disclosure can include a chassis, a number of rotating trenching blade assemblies connected to the chassis approximately parallel to each other, wherein the trenching blade assemblies are configured to dig respective trenches in the terrain when the apparatus is moved along the terrain, a number of reel mounts connected to the chassis, wherein the reel mounts are configured to hold reels of hose, a number of curved hose guides connected to the chassis in trailing positions relative to the trenching blade assemblies, wherein each hose guide can be aligned with a corresponding trenching blade assembly and can be configured to receive hose from a respective hose reel mounted on one of the reel mounts and deposit the hose into a trench dug by the corresponding trenching blade assembly, and a number of trench filler-packers connected to the chassis in trailing positions relative to the hose guides, wherein each trench filler-packer can be aligned with a corresponding hose guide, and wherein the trench filler-packers comprise a number of blades configured to push soil excavated from the trenches back into the trenches when the apparatus is moved along the terrain.

In at least one embodiment, each blade assembly can include a circular flange with a central hole configured to fit over a shaft, and a number of trenching blades mounted radially around the circumference of the circular flange, wherein each trenching blade comprises a tip with a sloped thickness cross-section. In at least one embodiment, each hose guide can include a J-shaped tube with an input aperture configured to receive hose from a hose reel and an output aperture from which the hose exits the hose guide into a trench, and a gusset supporting the J shaped tube and configured to prevent the J shaped tube from bending under pressure, wherein the gusset includes an angled plate opposite the J shape tube, wherein the plate can be configured to lift soil out of the trench before the hose is deposited in the trench. In at least one embodiment, each trench filler-packer can include a number of packing wheels configured to pack soil pushed into the trenches by the blades of the trench filler-packers as the apparatus is moved along the terrain.

In at least one embodiment, each trench filler-packer can include a first blade angled outward to a first side of the centerline toward the chassis, wherein the first blade is a first length, a first packing wheel trailing the first blade, a second blade trailing the first packing wheel, wherein the second blade is angled outward to a second side of the centerline toward the chassis, and wherein the second blade is the first length, a third blade opposite the centerline from the second blade and angled outward to the first side of the centerline toward the chassis, wherein the third blade is a second length that is shorter than the first length, and wherein a gap exists between the ends of the second blade and third blade that are distal from the chassis, a second packing wheel trailing the second blade and third blade, a fourth blade trailing the second packing wheel, wherein the fourth blade is angled outward to the second side of the centerline toward the chassis, and wherein the fourth blade is the first length, and a fifth blade opposite the centerline from the fourth blade and angled outward to the first side of the centerline toward the chassis, wherein the fifth blade is the second length, and wherein a gap exists between ends of the fourth blade and fifth blade that are distal from the chassis.

In at least one embodiment, the first blade, second blade, and third blade are connected to a fixed shaft connected to the chassis, the first packing wheel is mounted on a first swing arm connected to the fixed shaft, the second packing wheel is mounted on a second swing arm connected to the end of the fixed shaft distal to the chassis, and the fourth blade and fifth blade are connected to a third swing arm that is connected to an axle passing through the second packing wheel. In at least one embodiment, the height of the trenching blade assemblies, hose guides, and trench filler-packers can be adjustable, whether separately or in combination. In at least one embodiment, the reel mounts can be or include swiveling racks, such as T bar or other racks. In at least one embodiment, two or more trenching blade assemblies can be spaced apart, such as, for example, 10 to 24 inches apart.

In at least one embodiment, an apparatus for installing multiple strands of hose simultaneously, such as below a surface of terrain, according to the disclosure can include a chassis comprising a rotating shaft and a power take off gearbox differential configured to drive the shaft, four trenching blade assemblies connected to the rotating shaft, wherein the trenching blade assemblies are spaced 10 to 24 inches apart and are configured to dig parallel trenches in the terrain when the apparatus is moved along the terrain, two reel mounts connected to the chassis, wherein each reel mount comprises a swiveling T bar configured to hold two reels of coiled hose, four curved hose guides connected to the chassis in trailing positions relative to the trenching blade assemblies, wherein each hose guide is aligned with a corresponding trenching blade assembly and comprises a tube configured to receive a hose from a respective hose reel mounted on one of the reel mounts and deposit the hose into a trench dug by the corresponding trenching blade assembly, four trench filler-packers connected to the chassis in trailing positions relative to the hose guides, wherein each trench filler-packer is aligned with a corresponding hose guide, wherein each trench filler-packer can include at least three successive blades offset from each other and configured to push soil excavated from one of the trenches back into the trench, and at least two packing wheels interspersed with the blades, wherein the packing wheels are configured to pack soil pushed into the trench by the blades of the trench filler-packers as the apparatus is moved along the terrain. In at least one embodiment, the height of the trenching blade assemblies, hose guides, and trench filler-packers can be adjustable, separately or in combination.

In at least one embodiment, a method can include in a single pass, digging one or more trenches, disposing hose into one or more trenches, disposing soil excavated from one or more tranches back into one or more trenches, and packing at least a portion of the soil disposed back into the one or more trenches. In at least one embodiment, a method for installing multiple strands of hose simultaneously, such as below a surface of terrain, according to the disclosure can include pulling an apparatus over the terrain. In at least one embodiment, an apparatus can include a chassis, a number of rotating trenching blade assemblies connected to the chassis approximately parallel to each other, wherein the trenching blade assemblies are configured to dig respective trenches in the terrain when the apparatus is moved along the terrain, a number of reel mounts connected to the chassis, wherein the reel mounts are configured to hold reels of hose, a number of curved hose guides connected to the chassis in trailing positions relative to the trenching blade assemblies, wherein each hose guide is aligned with a corresponding trenching blade assembly and can be configured to receive hose from a respective hose reel mounted on one of the reel mounts and deposit the hose into a trench dug by the corresponding trenching blade assembly, and a number of trench filler-packers connected to the chassis in trailing positions relative to the hose guides, wherein each trench filler-packer is aligned with a corresponding hose guide, and wherein the trench filler-packers comprise a number of blades configured to push soil excavated from the trenches back into the trenches when the apparatus is moved along the terrain, and feeding hose from reels on the reel mounts into the hose guides as the apparatus is moved over the terrain.

In at least one embodiment, the hose can be or include dripline. In at least one embodiment, each blade assembly of the apparatus can include a circular flange with a central hole configured to fit over a shaft, and a number of trenching blades mounted radially around the circumference of the circular flange, wherein each trenching blade comprises a tip with a sloped thickness cross-section. In at least one embodiment, each hose guide of the apparatus can include a J shaped tube with an input aperture configured to receive hose from a hose reel and an output aperture from which the hose exits the hose guide into a trench, and a gusset supporting the J shaped tube and configured to prevent the J shaped tube from bending under pressure, wherein the gusset includes an angled plate opposite the J shape tube, wherein the plate can be configured to lift soil out of the trench before the hose is deposited in the trench.

In at least one embodiment, each trench filler-packer of the apparatus can include a first blade angled outward to a first side of the centerline toward the chassis, wherein the first blade is a first length, a first packing wheel trailing the first blade, a second blade trailing the first packing wheel, wherein the second blade is angled outward to a second side of the centerline toward the chassis, and wherein the second blade is the first length, a third blade opposite the centerline from the second blade and angled outward to the first side of the centerline toward the chassis, wherein the third blade is a second length that is shorter than the first length, and wherein a gap exists between the ends of the second blade and third blade that are distal from the chassis, a second packing wheel trailing the second blade and third blade, a fourth blade trailing the second packing wheel, wherein the fourth blade is angled outward to the second side of the centerline toward the chassis, and wherein the fourth blade is the first length, and a fifth blade opposite the centerline from the fourth blade and angled outward to the first second side of the centerline toward the chassis, wherein the fifth blade is the second length, and wherein a gap exists between ends of the fourth blade and fifth blade that are distal from the chassis.

In at least one embodiment, one or more blades can be connected to a fixed or other shaft connected to the chassis, a first packing wheel can be mounted on a first swing arm connected to the shaft, a second packing wheel can be mounted on a second swing arm connected to an end of the shaft distal to the chassis, and one or more blades can be connected to a third swing arm that is connected to an axle passing through the second packing wheel. In at least one embodiment, a method can include adjusting the height of the trenching blade assemblies, hose guides, and trench filler-packers to install the hose at a specified or other depth below a surface of terrain. In at least one embodiment, one or more reel mounts of the apparatus can comprise swiveling T bar racks. In at least one embodiment, two or more trenching blade assemblies can be spaced from one another, such as, for example, 10 to 24 inches apart.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a chassis;
a trenching blade assembly comprising one or more trenching blades coupled to the chassis and configured to dig a trench by removing soil from terrain;
a reel mount in operable communication with the chassis, wherein the reel mount is configured to hold a reel of hose;
a hose guide connected to the chassis, wherein the hose guide is configured to guide hose into the trench; and
a trench filler-packer connected to the chassis;
wherein the trench filler-packer comprises
one or more filler blades disposed at one or more angles relative to a centerline of the trench and configured to dispose at least a first portion of the removed soil into the trench; and
at least one first packing wheel configured to be disposed at least partially within the trench and to pack at least a portion of the first portion of the removed soil in the trench.

2. The apparatus of claim 1, wherein the apparatus is configured to, in a single pass, dig the trench, dispose at least a portion of the hose into the trench, dispose the first portion of the removed soil into the trench, and pack the at least a portion of the first portion of the removed soil in the trench.

3. The apparatus of claim 1, further comprising at least one second packing wheel disposed in trailing relation to the at least one first packing wheel and at a higher elevation than the at least one first packing wheel.

4. The apparatus of claim 3, wherein the at least one first packing wheel and the at least one second packing wheel are disposed in trailing relation to at least one of the one or more filler blades.

5. The apparatus of claim 1, wherein the one or more filler blades comprises a plurality of filler blades disposed at different angles relative to the centerline of the trench; wherein the plurality of filler blades comprises a second filler blade disposed in trailing relation to a first filler blade; and wherein at least one of the first filler blade and the second filler blade is disposed in trailing relation to the at least one first packing wheel.

6. The apparatus of claim 1, further comprising a plate coupled to the chassis rearwardly of the trenching blade assembly, wherein the plate is configured to route soil out of the trench, and wherein the plate is coupled to the hose guide.

7. The apparatus of claim 1, wherein the reel mount is coupled to the chassis and comprises a support bar, and wherein the reel mount is configured to selectively rotate about a central longitudinal axis of the support bar.

8. The apparatus of claim 7, wherein the reel mount is hingedly coupled to the chassis and configured to selectively rotate forwards and backwards among two or more positions.

9. The apparatus of claim 1, wherein the one or more trenching blades are rotateably coupled to the chassis.

10. The apparatus of claim 1, wherein a blade depth of the trenching blade assembly is adjustable relative to a surface of the terrain for selectively adjusting a trench depth of the trench.

11. The apparatus of claim 10, wherein at least one of the hose guide and the trench filler-packer is configured to be positioned simultaneously with the trenching blade assembly.

12. The apparatus of claim 10, further comprising one or more slides rotateably coupled to the chassis.

13. The apparatus of claim 1, wherein the hose guide comprises a hose inlet and a hose outlet, and wherein the hose outlet is configured to be disposed in the trench rearwardly of the one or more trenching blades.

14. The apparatus of claim 1, further comprising the reel of hose coupled to the reel mount.

15. An apparatus, comprising:
- a chassis;
- a trenching blade assembly comprising one or more trenching blades coupled to the chassis and configured to dig a trench by removing soil from terrain;
- a reel mount in operable communication with the chassis, wherein the reel mount is configured to hold a reel of hose;
- a hose guide connected to the chassis, wherein the hose guide is configured to guide hose into the trench; and
- a trench filler-packer connected to the chassis, wherein the trench filler-packer is configured to dispose at least a first portion of the removed soil into the trench via three or more filler blades disposed rearwardly of the one or more trenching blades and to pack at least a portion of the first portion of the removed soil via at least two packing wheels disposed rearwardly of at least one of the three or more filler blades and configured to be disposed at least partially within the trench;
- wherein the apparatus is configured to, in a single pass, dig the trench, dispose at least a portion of the hose into the trench, dispose the first portion of the removed soil into the trench, and pack the at least a portion of the first portion of the removed soil in the trench; and
- wherein the three or more filler blades and the at least two packing wheels collectively comprise
  - a first filler blade, being a forwardmost filler blade disposed rearwardly of the one or more trenching blades;
  - a second filler blade disposed rearwardly of the first filler blade;
  - a third filler blade disposed rearwardly of the second filler blade;
  - a first packing wheel disposed at least partially between the first filler blade and the second filler blade; and
  - a second packing wheel disposed at least partially between the second filler blade and the third filler blade.

16. The apparatus of claim 15, wherein the three or more filler blades comprises a plurality of filler blades disposed at different angles relative to a centerline of the trench.

17. The apparatus of claim 16, further comprising a plate coupled to the chassis rearwardly of the trenching blade assembly, wherein the plate is configured to route soil out of the trench.

18. An apparatus, comprising:
- a chassis;
- first and second trenching blade assemblies, each trenching blade assembly comprising one or more trenching blades coupled to the chassis, wherein the first and second trenching blade assemblies are configured to dig first and second trenches, respectively, by removing soil from terrain;
- a reel mount in operable communication with the chassis, wherein the reel mount is configured to hold at least one reel of hose;
- first and second hose guides connected to the chassis and configured to guide hose into the first and second trenches, respectively; and
- first and second trench filler-packers connected to the chassis, wherein each of the first and second trench filler-packers comprises three or more filler blades disposed rearwardly of the one or more trenching blades of the first and second trenching blade assemblies, respectively, and two or more packing wheels configured to be disposed at least partially within the first and second trenches, respectively, rearwardly of the three or more filler blades;
- wherein the apparatus is configured to, in a single pass, dig the first and second trenches, dispose at least a portion of the hose into at least one of the first and second trenches, dispose at least a first portion of the removed soil into the first and second trenches with the three or more filler blades of the first and second trench filler-packers, respectively, and pack at least a portion of the first portion of the removed soil in the first and second trenches with the two or more packing wheels of the first and second trench filler-packers, respectively; and
- wherein the three or more filler blades and two or more packing wheels of at least one of the first and second trench filler-packers collectively comprise a first filler blade, being a forwardmost filler blade disposed rearwardly of the one or more trenching blades;

a second filler blade disposed rearwardly of the first filler blade;

a third filler blade disposed rearwardly of the second filler blade;

a first packing wheel disposed at least partially between the first filler blade and the second filler blade; and a second packing wheel disposed at least partially between the second filler blade and the third filler blade.

19. The apparatus of claim 18, wherein the three or more filler blades of at least one of the first and second trench filler-packers comprises a plurality of filler blades disposed at one or more angles relative to a centerline of the respective one of the first and second trenches.

20. The apparatus of claim 18, further comprising a first plate coupled to the chassis rearwardly of the first trenching blade assembly and a second plate coupled to the chassis rearwardly of the second trenching blade assembly, wherein the first and second plates are configured to route soil out of the first and second trenches, respectively.

* * * * *